US007347912B2

(12) United States Patent
Engel et al.

(10) Patent No.: US 7,347,912 B2
(45) Date of Patent: Mar. 25, 2008

(54) PROCESS FOR THE MANUFACTURE OF A VENEER

(76) Inventors: Michael Engel, Le Closel, Ballens (CH) CH-1144; Wolfgang Lacroix, Eschenweg 9, Pfalzgrafenweiler (DE) DE-72285; Peter Spitaler, Schwenkgasse 21/16, Wien (AT) AT-1120; Patrick Guitton, 1 chemin de la Chalnee, Asnans (FR) FR-39120; Hans-Joachim Danzer, Boja 42, Eschen (LI) FL 9294

( * ) Notice: Subject to any disclaimer, the term of this patent is extended or adjusted under 35 U.S.C. 154(b) by 0 days.

(21) Appl. No.: 11/273,377

(22) Filed: Nov. 14, 2005

(65) Prior Publication Data

US 2006/0162851 A1 Jul. 27, 2006

(30) Foreign Application Priority Data

Jan. 27, 2005 (DE) ...................... 10 2005 005 339

(51) Int. Cl.
*B32B 37/00* (2006.01)

(52) U.S. Cl. ................... 156/153; 156/264; 156/272.2; 156/499; 156/510; 156/578; 156/580

(58) Field of Classification Search ................ 156/153, 156/250, 272.2, 281, 499, 510, 580, 583.1, 156/264, 379.6, 379.8, 578
See application file for complete search history.

(56) References Cited

U.S. PATENT DOCUMENTS 3,897,581 A 7/1975 Nakatsuka et al.
3,969,558 A 7/1976 Sadashige
3,977,449 A 8/1976 Sadashige
4,293,362 A * 10/1981 Drobina ...................... 156/264
4,743,509 A * 5/1988 Vladimiro ................ 428/425.1
5,143,792 A 9/1992 Cramer et al.
5,277,953 A * 1/1994 Tsuda .......................... 428/53
5,418,034 A * 5/1995 McGuire, III ............... 428/106
5,979,524 A 11/1999 Trost
6,102,090 A 8/2000 Gruender et al.
6,474,379 B1 11/2002 Mellor et al.

OTHER PUBLICATIONS

Tschernitz, John L., "Empirical Equations for Estimating Drying Times of Thick Rotary-Cut Veneer in Press and Jet Dryers", May 1985, US Department of Agriculture, Forest Service, pp. 1-16.*

Koch, Peter, "High-Temperature Kilning of Southern Pine Poles, Timbers, Lumber and Thick Veneer", 1973, American Wood-Preservers' Association, pp. 123-140.*

* cited by examiner

*Primary Examiner*—James Sells
(74) *Attorney, Agent, or Firm*—Jones Day

(57) ABSTRACT

A process for the manufacture of veneer comprises gluing board-like, plane pieces of wood together with an adhesive to form a beam-like block of wood. The humidity content of the beam-like block of wood is increased. Veneer is cut from the beam-like block of wood and dried until the humidity content is below a fiber saturation point. Because of the rules governing abstracts, this abstract should not be used to construe the claims.

45 Claims, 13 Drawing Sheets

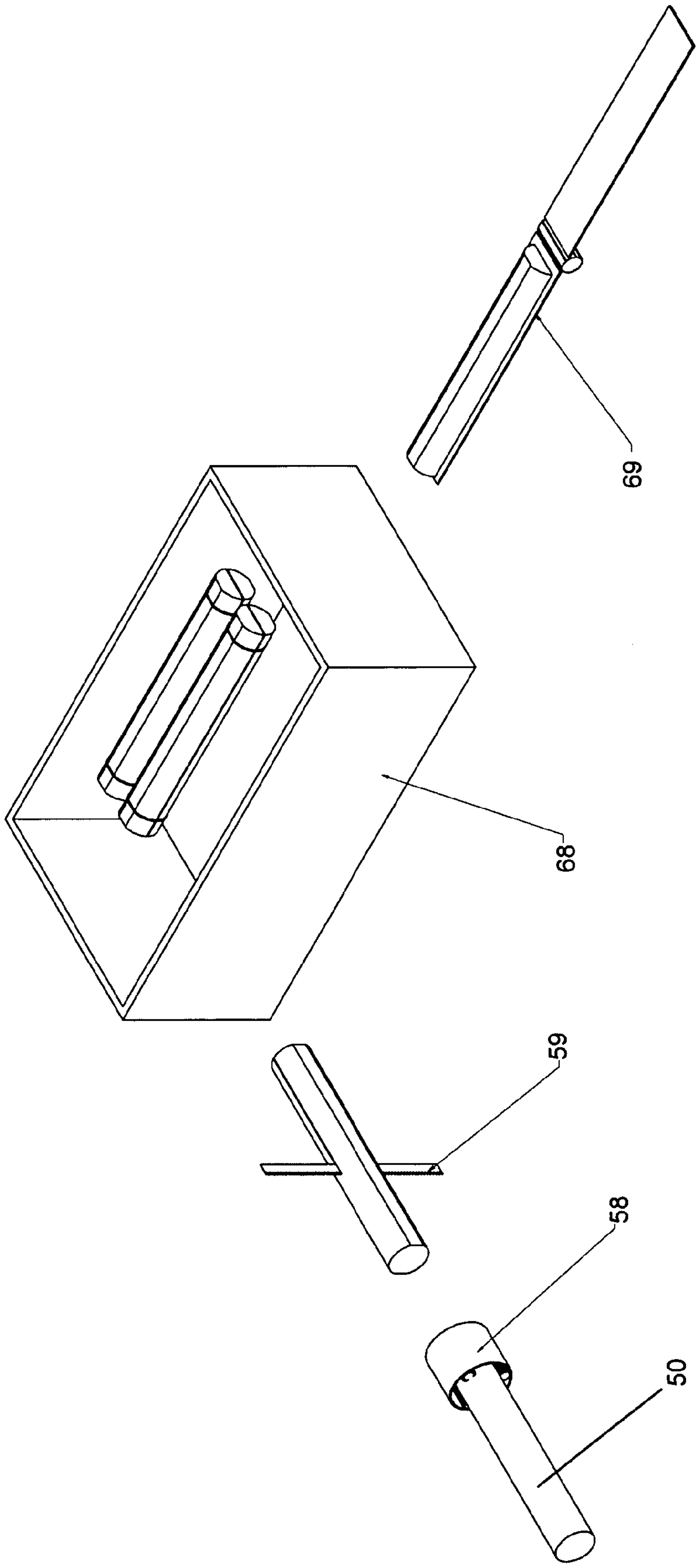
Fig. 18.1

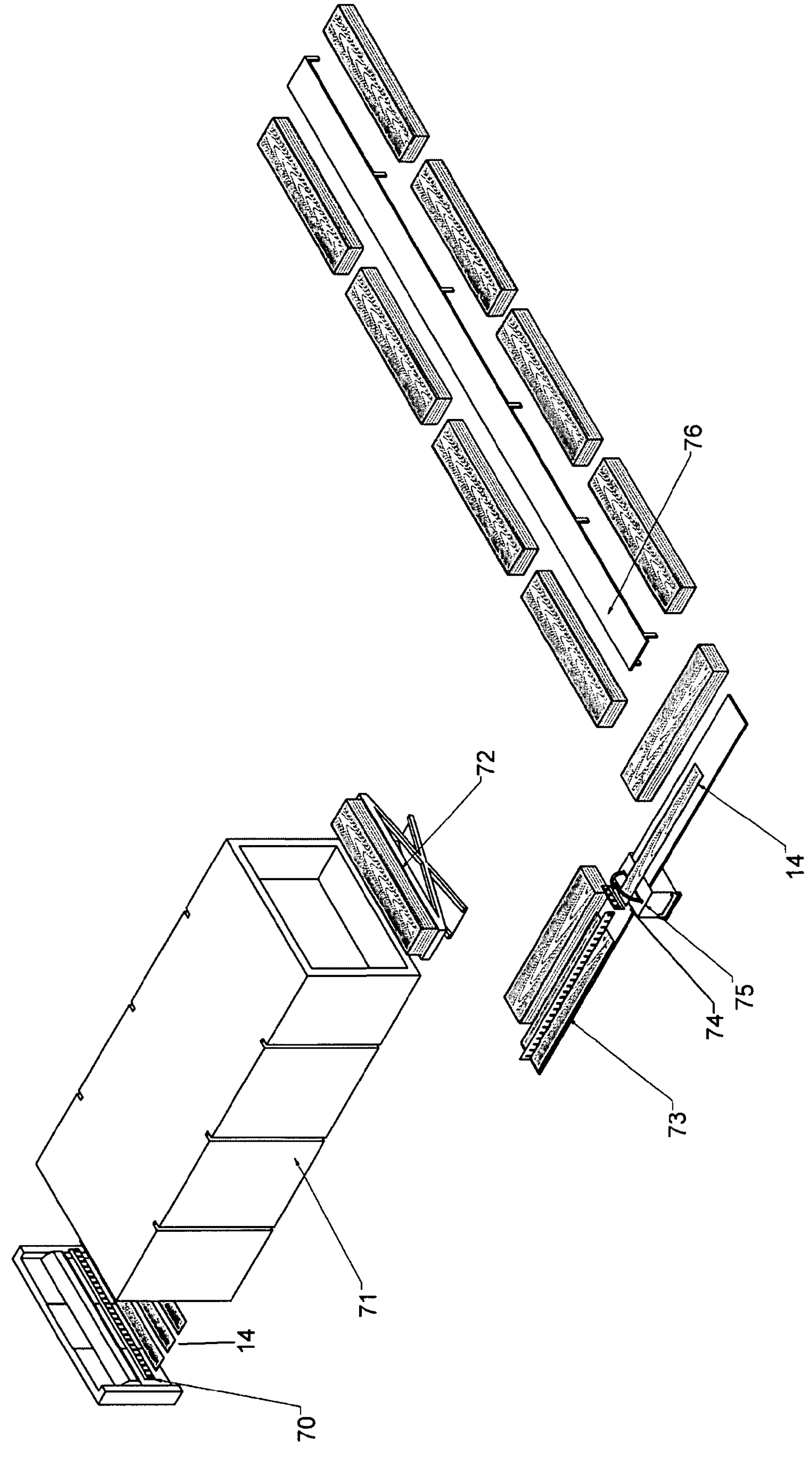
Fig. 18.2

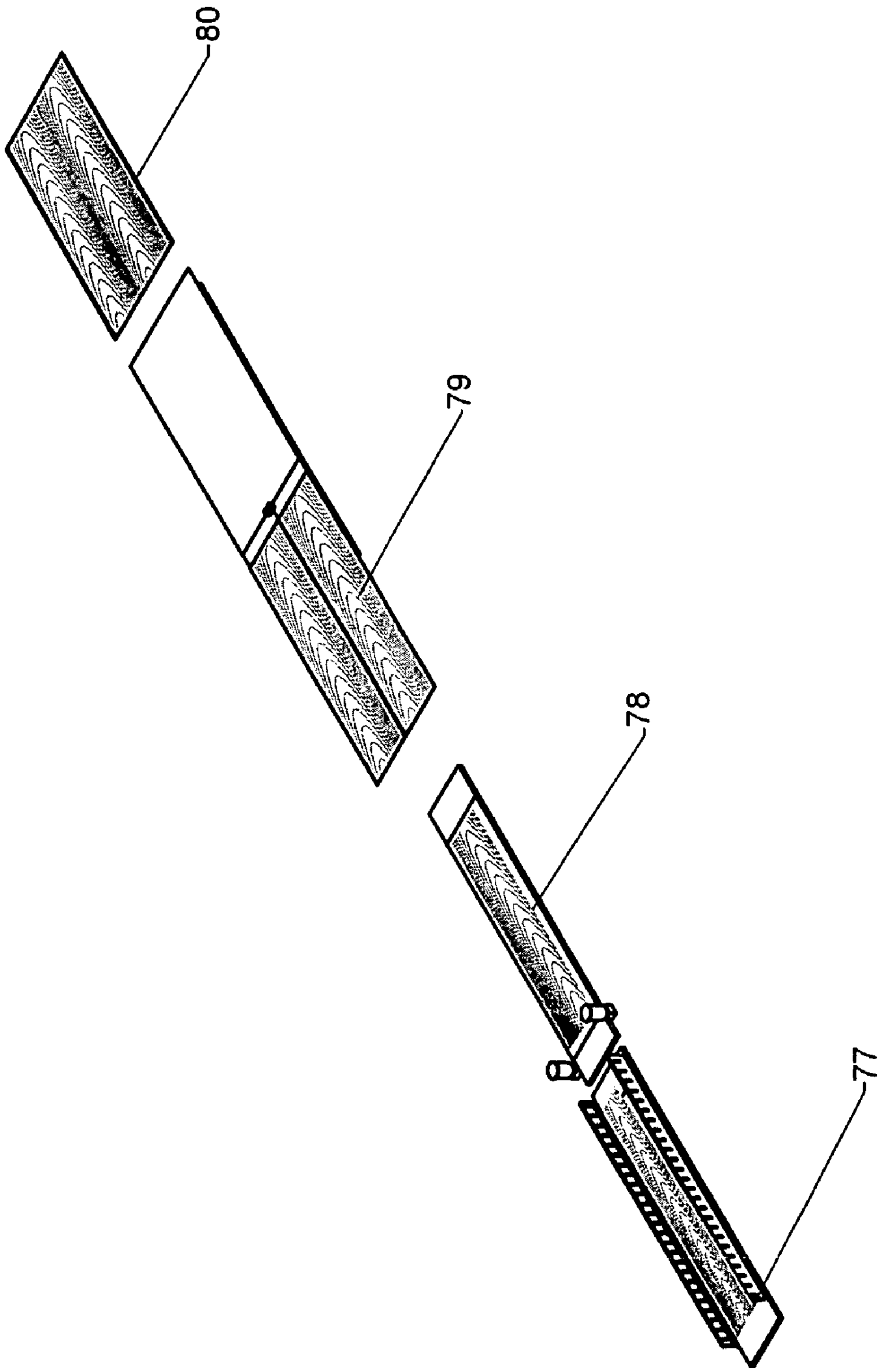
Fig. 18.3

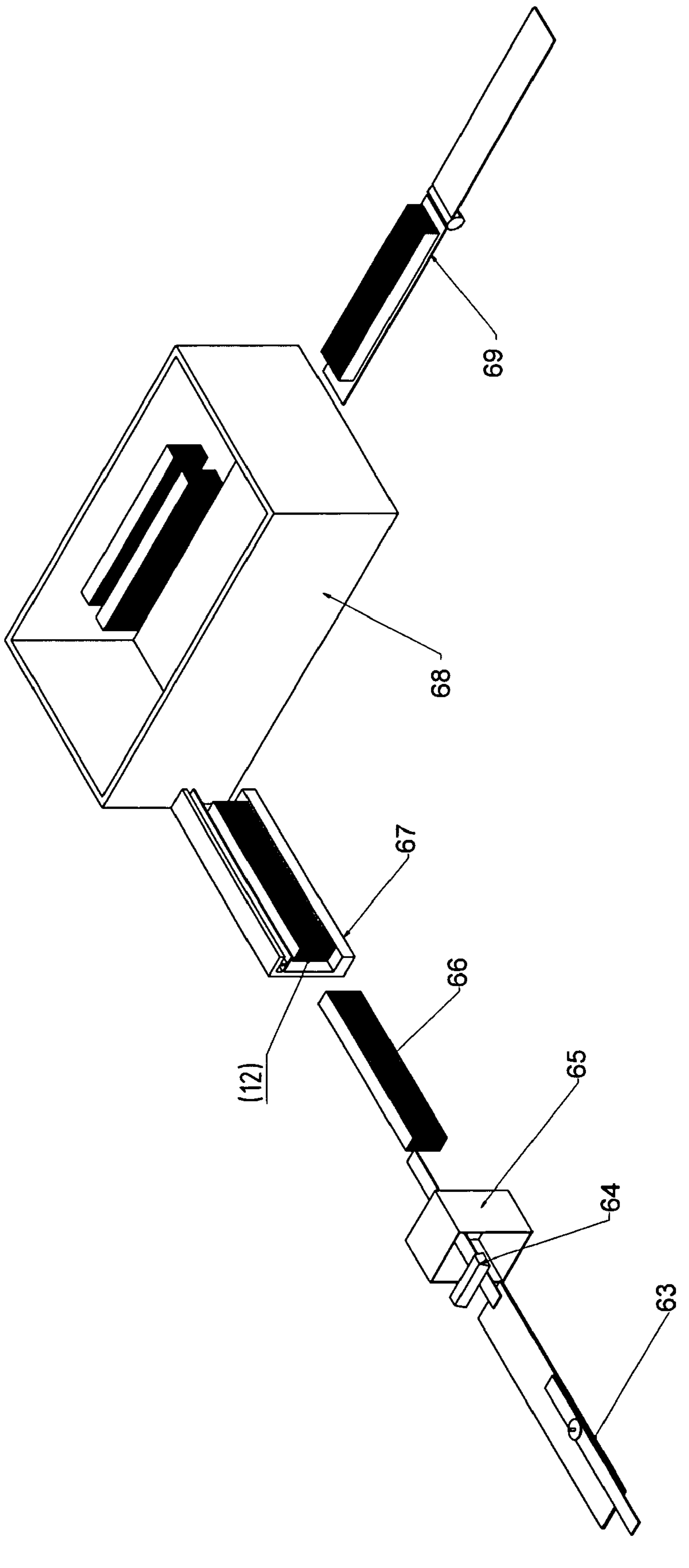
Fig. 19.1

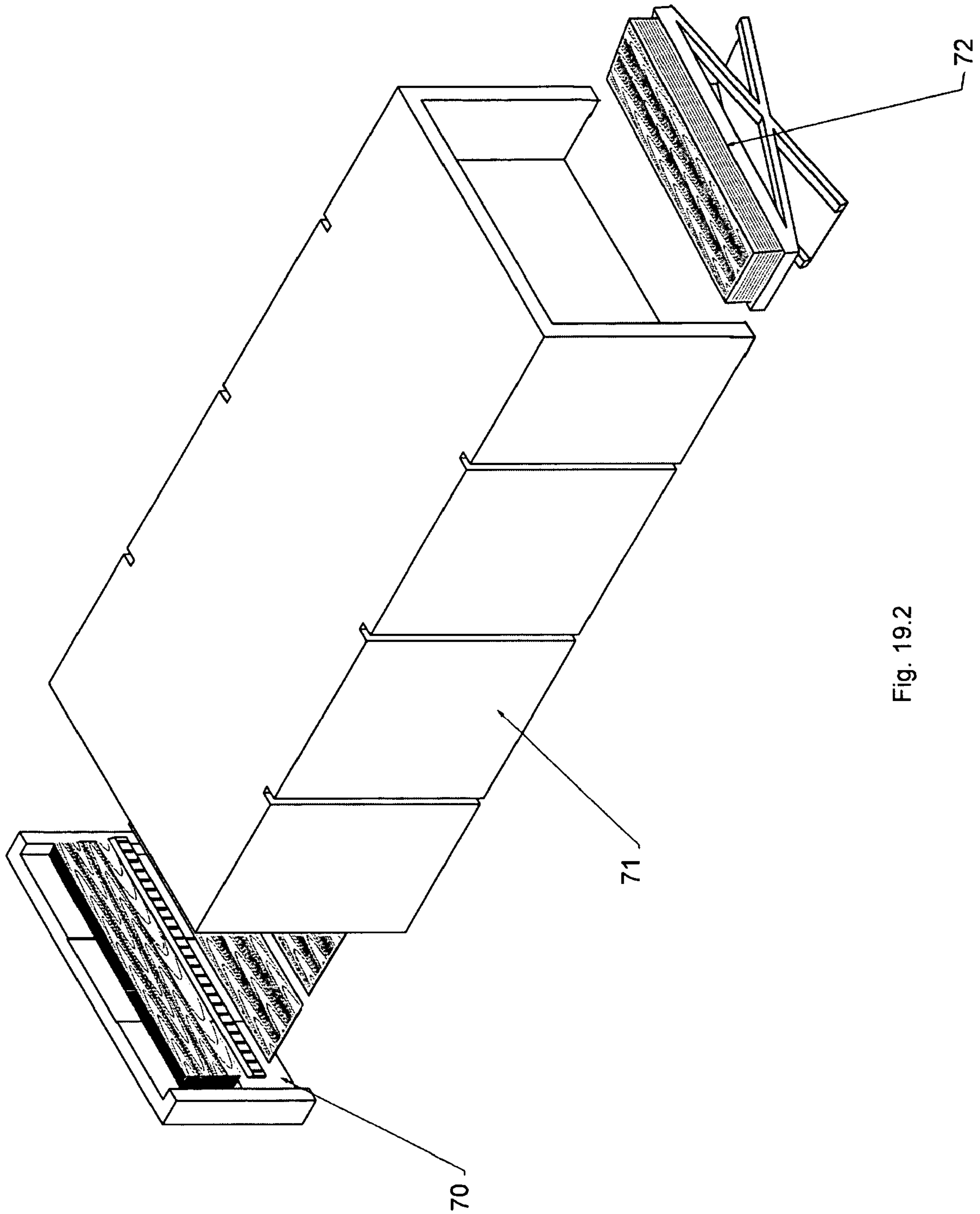
Fig. 19.2

PROCESS FOR THE MANUFACTURE OF A VENEER

CROSS REFERENCE TO RELATED APPLICATION

This application claims the benefit of German Patent Application No. 10 2005 005 339.4 filed Jan. 27, 2005; European Patent Application No. EP05024664, filed on Nov. 11, 2005; and PCT Application No. PCT/EP05/12118, filed Nov. 11, 2005.

The invention relates to a process for the manufacture of a veneer, to a process for the manufacture of a beam-like block of wood from which said veneer is manufactured, to the veneer and the beam-like block per se which are produced by means of said processes, as well as to a device for carrying out said processes. In said processes, particular adhesives based on a polyurethane may be used.

BACKGROUND

As is known, the manufacture of veneers is a production technique for the manufacture of decorative, high-quality surface materials made from real wood. Thereby, in the conventional manufacture of veneers, logs are decorticated, or "de-barked," then said logs are sawn into halves, thirds, quarters or other parts of a log (so called "flitches") and are subsequently watered, as a rule, for several days at an increased temperature, in order to prepare them for the subsequent cutting to veneer, the so-called slicing. Then, said slicing process results in veneers having a different thickness, for example veneers having a thickness of approximately 0.5 mm, whereby, dependent on the cutting process, in the obtained product, one distinguishes between the so-called sliced veneer (horizontal or vertical slicing), the so-called peeled veneer (rotary slicing) or the staylog (eccentrical rotary slicing).

Schematically, in perspective views, the widest spread slicing, the horizontally or vertically slicing, is presented in the FIG. 15 to 17. FIG. 15 shows a bisected log 10 which is sliced along the direction of the wood fiber. On the other hand, FIGS. 16 and 17 show a slicing transversely to the fiber direction. Subsequent to said slicing process, a waste board 10 remains which is also termed as "backing board" being shown in FIG. 17. For technological reasons, said backing board cannot be processed to a veneer because the mountings in the cutting equipment cause a waste which cannot be further processed.

Subsequently, the so obtained raw veneer mostly having thicknesses of from about 0.45 mm to 2.5 mm, preferably of from 0.45 mm to 0.8 mm, is dried within some minutes, preferably at temperatures above 100° C. In case of strong corrugation, or "buckling," said veneer is additionally subjected to a pressing step.

Subsequently, the dried raw veneer is cut to size and is sorted according to qualities. For said cutting to size, high material losses have to be accepted, which can be up to 60%.

Per stroke of the slicer, and after cutting to size, a (sellable) veneer is generated having a surface area of approximately 0.6 $m^2$.

This problem with the manufacture of a veneer which is a precise, however complex and highly wasteful process, is intensified by the fact that the starting material "wood" respectively "tree" is a natural product. Thereby, as a rule, it can not be predicted, whether a log being used for the veneer manufacture results in an acceptable final product veneer. If at all, only very experienced wood purchasers are capable of making reasonably realistic predictions of end product quality. Inclusions, limb rudiments and imperfections in the log are most often unrecognizable, and therefore result in defects in the raw veneer that frequently cannot be accepted for its further processing. All this results in up to 85% material waste generation from the raw material log up to the final product veneer, which has to be accepted in said manufacturing process.

A conventional subsequent working process for the manufacture of a completed surface consists in the assembling of several individual veneer sheets in an assembly factory, or "splicing factory," and in the subsequent trimming of said assembled/spliced veneer surfaces. As a rule, the assembling/splicing of the veneer sheets is carried out by gluing individual veneer sheets, and, in fact mostly by simultaneously applying heat and pressure, using so called longitudinal or cross feed splicing machines. However, the gluing of the thin and therewith sensitive veneer sheets which cannot be easily handled has proved to be complex, and no striated, thin, linear looking veneers can be manufactured because, for achieving an adequate gluing, the veneer sheets to be assembled have to have a certain minimal width. Furthermore, the local application of heat can affect the wood properties (for example the color), and excess glue must be removed in the region of the glue joints.

Subsequently, the obtained veneer can be applied by gluing onto a substrate, such as a particle board.

The above described process steps are comprised by the so-called "European method" or "North American method" for the manufacture of veneers.

In another technical process, the so-called "Asian method", said raw veneer is obtained in a thickness of approximately from 0.1 mm to 0.8 mm. After the optional clipping of the edges (lengthwise), the still wet sheets of veneer are applied onto a substrate by means of gluing. Mostly the substrate is plywood. Then, the customers buy the "fancy plywood" and cut out the part of the panel that they need. This results in low yields, as the needed sizes do not necessarily match the size of the plywood panel.

Said Asian style of veneer manufacturing requires an integrated process. The veneer after the slicing of the flitch/block has a high humidity content (above the fiber saturation point). Leaving the sheet laying for a little while creates mold and deterioration of the veneers making them unusable. No storage or transportation over longer distances is possible. Only once the veneer is pressed on the substrate, the product can be transported/handled. The value of the substrate is considerably lower than the veneer itself. Thereby, a veneer product can be economically transported significantly farther than a fancy plywood product. This is particularly important with increasing transport cost.

The precision required to produce these extremely thin veneers is only possible with equipment that can typically produce less than 45 sheets per minute.

Further, the U.S. Pat. No. 3,969,558 discloses the gluing of short pieces of a wooden beam, which subsequently can be sliced. For the gluing, said patent suggests adhesives such as epoxy resin, phenolic resin and resorcinol resin. Said U.S. Pat. No. 3,969,558 aims to avoid the heating/boiling process to be applied in the conventional manufacture of veneers, and suggests, during the whole process, to permanently keep the humidity content of the wood on or above the fiber saturation point. Further, said document suggests that no heating/boiling process takes place prior to the cutting. Therefore, during the whole process, it has to be strictly paid attention that the humidity content of the wood is not decreased, also not short-termed. Finally, said veneer having a thickness between 0.1 and 0.8 mm and a humidity content of more than the fiber saturation point of the wood is overlaid and glued onto a substrate.

The U.S. Pat. No. 3,897,581 discloses the gluing of short, beam-like pieces of wood followed by slicing, whereby the gluing is carried out by the application of a special polyurethane adhesive which also cures in the presence of humidity.

U.S. Pat. No. 3,977,449 discloses a process for the manufacture of wood veneer having a large area and elaborate designed wooden patterns adaptable for mass-production. In said process, a log is sawn or sliced into a plurality of individual flitches which are smoothed on the surfaces and are subsequently glued by an adhesive to form a composite flitch. The composite flitch is subsequently sliced to form a sheet of wide wood veneer which may be glued to a substrate or a veneer by means of an adhesive. Throughout the process, all steps are carried out while the wood is maintained at a humidity content at or above the fiber saturation point of the wood. Also the humidity content of the obtained veneer is kept at or above the fiber saturation point.

Besides the conventional manufacture of veneers, so-called technical veneers are also known. In manufacturing said veneer type, it is aspired to achieve a constant quality and a dimensional accuracy in order to be able to better predict the characteristics of the final product veneer.

In this context, for example, conventionally manufactured peeled veneers, optionally after a pretreatment such as dyeing or baking of structures, are glued to each other, and the so obtained material is subsequently re-sliced. Thereby, a veneer surface can be created having a mostly predetermined surface structure, and the material waste can be reduced. However, the so obtained veneers are, concerning their surface, by no means comparable with a normal veneer surface, because the obtained final product has an artificial aesthetic, and does not give the impression of real wood. It is also obvious that such processes are comparatively complex.

The invention is based on the problem to improve the processes for the manufacture of veneers currently known such that, starting from the original employed raw material wood, a high yield of the high-quality final product veneer can be achieved with minimal complexity. Thereby, on the one hand, the process should be kept as simple as possible, and on the other hand, the further processing of the obtained veneer should be facilitated for the user, for example, the manufacturer of furniture. Furthermore, in the veneer, the aesthetics of the used real wood should be maintained. In addition it was the objective to use standard equipment of the European style veneer manufacturing process, in particular slicers allowing slicing speeds in excess of 90 sheets per minute.

SUMMARY OF THE INVENTION

Said object is solved by a process for the manufacture of a veneer and by the device for carrying out said process according to the claims. Further, the solution of said object comprises the manufacture of a beam-like block of wood as set forth in the claims. The veneer produced by the process is also claimed.

Particularly preferred embodiments of the invention are defined in the dependent claims. With this, the entire wording of all claims is incorporated into this description by reference.

In the process for the manufacture of a veneer according to the invention, board-like, plane pieces of wood are firstly holohedrally glued with a glue/adhesive that also cures in the presence of humidity to a beam-like block of wood. Said block of wood is cut along a defined section plane to a veneer.

According to the invention, the beam-like block of wood is watered and/or tempered prior to the cutting, whereby the watering and/or tempering preferably is carried out at an increased temperature, preferably at a temperature of >60° C., more preferred at a temperature of >70° C., in particular at a temperature between 75 and 85° C. A temperature of approximately 80° C. is well suited.

Said watering and/or tempering is carried out over a period of preferably several days, in particular over a period of more than two days, in particular over a period of two to three days.

The veneer that is obtained from said beam-like block of wood by cutting (slicing)) is dried in order to reduce the humidity content below the fiber saturation point of the wood. Preferably, the humidity content of the dried veneer is below 80%, more preferred below 60%, still more preferred below 40%. In particular, the water content is below 20%. Very particularly preferred veneers have a humidity content between 5 and 20%.

Said fiber saturation point defines the point in the drying process of wood where said wood predominantly contains no "free" water however only "bonded" water. "Free" water is in the cell cavities of the wood, and "bonded" water is in the cell walls of the wood.

The humidity content is determined according to DIN 52 183.

Other determination methods may also be used, such as electrical methods (measurement of the ohmic resistance) or the determination via reflection of infrared radiation. However, it is advisable to use the above DIN method as a calibration method in order to obtain comparable values.

In one embodiment of the invention, said process for the manufacture of a veneer comprises steps (i) to (iv):

(i) gluing board-like, plane pieces of wood by means of an adhesive to a beam-like block of wood, (ii) watering and/or tempering said beam-like block of wood, (iii) cutting said beam-like block of wood to a veneer, (iv) drying said veneer obtained in step (iii) until the humidity content is below the fiber saturation point.

In another embodiment, per stroke of the slicer which is used in step (iii), a veneer is obtained in step (iv) where one surface area preferably is of from 1 to 4 $m^2$, more preferred of from 1.5 to 3.5 $m^2$.

In a preferred embodiment, the length of the veneer obtained in step (iv) essentially corresponds to the length of said block of wood.

The drying in step (iv) is carried out at an increased temperature, preferably at a temperature of >40° C., more preferred >70° C., in particular >100° C.

Preferably, the drying is carried out directly after said cutting in step (iii).

In another preferred embodiment, said process further comprises one or more of the following steps (v) to (vii):

(v) prior to step (i): planing at least one surface of said board-like pieces of wood;

(vi) prior to step (ii): pressing said beam-like block of wood;

(vii) prior to step (vi): stacking said board-like pieces of wood.

The inventors have detected that the processes according to the invention allow the manufacture of a large variety of various veneers having a first-class quality in an economical manner. Advantageously, in said processes, the commonly used machines and devices can be applied. By means of the conditioning steps according to the claims, a cutting of the veneers results that is particularly smooth, and that has a high quality, which, also for a low thickness of the veneers, does not cause cracks. Thereby, in the context of the present invention, it is indeed possible, however not mandatory to keep the humidity content of the wood permanently on or above the fiber saturation point for the duration of the whole process with the exception of step (iv). In this manner, the processes according to the invention are clearly simplified compared to the prior art, for example compared to the process as disclosed in the U.S. Pat. No. 3,969,558.

At the same time, however, according to the processes according to the invention, veneers are also provided having an excellent quality and economy. By applying as starting material an adhesive that cures also in the presence of humidity, arbitrary pieces of wood can be employed without prior conditioning, for example in a drying chamber for the adjustment of a certain humidity content. By means of the extensive gluing, high-quality and stable glue joints result without affecting the veneer properties (for example by heat), and without the necessity to remove excess glue in the region of the joints. Furthermore, from the outset, the veneer can be produced in the desired dimensions that can be adapted to the subsequent processing, so that the waste is minimized, because a trimming is no longer required. Last but not least, the processes according to the invention also allow the manufacture of variously structured and striated, thin, linear looking veneers.

Thereby, the pieces of wood being used as starting material are such pieces that usually are termed as boards. However, there should be no restriction concerning, for example, the thickness respective to the gage of said pieces of wood, as long as, for example, the length of said pieces of wood is larger than the thickness of such pieces of wood. The same applies to the beam-like blocks of wood which are obtained in carrying out the process. Also here, there should be no restriction concerning the dimensions of the respective blocks of wood.

Further, it has to be considered that, in the context of the present invention, the veneers are cut, however not sawn or otherwise formed in a fiber removing (machining) process. Said cutting is frequently also termed as "slicing" and relates to the formation of a veneer by means of a knife, a blade or the like.

For the creation of various surface patterns according to the invention, the section plane along which the block of wood is cut to a veneer can be freely selected. Here, it is possible, by appropriate selection of the section plane, also to carry out a rotary slicing or a staylog process. As a rule, preferably, it is processed in a manner that one cuts transversely, in particular perpendicularly to a plane which is defined by the adhesion layers. Alternatively or additionally, according to one embodiment of the invention, it is provided that the section direction extends transversely to the fiber direction of the pieces of wood, in particular essentially perpendicularly, whereby the section plane is preferably in parallel to a plane which includes the longitudinal axis of the block of wood.

Fundamentally, in the processes according to the invention, arbitrary pieces of wood can be employed. So, for example, such pieces of wood can be employed that are glued to each other from varying solid wood parts. However, it is preferred that said pieces of wood are solid wood boards. Such boards are normally sawn boards from different wood types, which, optionally, are planed on one or both flat sides. As mentioned above, the thickness, or "gage" of such solid wood boards is not critical for the process according to the invention.

According to one embodiment of the invention, it has proved to be particularly economical that the solid wood boards are waste boards which are produced in the conventional manufacturing process of veneers. Said so-called "backing boards" are boards having a thickness of several mm which, for technical reasons, however, cannot be further sliced, though the wood of said boards has mostly a very high quality. Said high-quality material can be used in a simple manner by means of the process according to the invention. This is advantageous if the slicing wastes result from the center of the block, because here it is high-quality wood, and in the further process suitable measures (for example slicing angle/section plane) can be made regarding the medullary rays not being present in the resulting veneer, which would otherwise substantially diminish the economic value.

According to one embodiment of the present invention, the pieces of wood are sections that are separated from the center of a log, or "roundwood" by cleaving the log, preferably, in at least three sections. First, the use of such green log sections has the advantage that the wood is still essentially untreated, and the probability is decreased that in the further processing changes of the material result, such as staining. Furthermore, sections from the center of a log have the specialty that in said sections the medullary rays are particularly developed which more clearly come forward in conventional veneers. In contrast, in the scope of the present invention, the center sections of a log of which the semicircular sections are cleaved, can be manufactured to veneers by a suitable processing having appropriate section planes, in which the medullary rays are hardly visible or are not visible at all.

In this context, according to one embodiment of the present invention, it is further preferred that the pieces of wood are essentially semicircular sections which were cleaved from the border ranges of a log by cleaving the log preferably in at least three sections, whereby said essentially semicircular sections are glued to each other with their flat side, and subsequently, preferably, are essentially cut parallel to the plane which is defined by the adhesion layers. Here, it is a completely novel manufacturing process, in which firstly the medium section of a log is taken and is processed as mentioned above, while on the other hand the border sections of the log can be glued to each other in order to allow the slicing of said border sections having as little waste as possible using standard equipment for conventional veneer manufacturing.

Preferably, in the processes according to the invention, pieces of wood are employed having a comparatively high (relative) wood humidity. This is an advantage for the subsequent slicing process, in which the wood to be cut typically must have a high wood humidity. Accordingly, the pieces of wood being glued in the process according to the invention, particularly have a relative wood humidity at and above the fiber saturation point. The fiber saturation point varies between 60% to 90% relative wood humidity dependent on the wood species. In such situations then, said wood preferably is so-called green lumber, that is, wood from freshly cut trees that either was stored not at all or, in comparison, was optionally stored only for a short time. On an average, such green lumber has a relative humidity of approximately 80%.

In further embodiments of the processes according to the invention, the employed pieces of wood are glued having very high wood humidity (wet), whereby, for example, said high wood humidity can also be achieved by watering said pieces of wood. In such situations, one has to assume a relative wood humidity of >50%, in particular between 50% and 80% or even above 80%.

As already mentioned above, in the process according to the invention, the board-like, plane pieces of wood are glued with one another by means of an adhesive, preferably holohedrally. In said context, it is understandable that said adhesive/glue must be able to provide a fixed, stable composite between the glued pieces of wood. Furthermore, as discussed later, the adhesive must resist a treatment of the block of wood that was obtained by the adhesion prior to the cutting (for example a treatment by watering) as well as a treatment of the veneer that was obtained after the cutting (for example a treatment by drying). Finally, the adhesive must ensure a reliable adhesive joint, if, for example, pieces of wood having a high wood humidity (wet) should be glued to each other.

Here, already, a series of adhesives is known that at least partially fulfill the mentioned requirements, and that lead to an at least satisfying adhesive connection between the pieces of wood.

Particularly suited for the process according to the invention are the so-called polyurethane adhesives, whereby said adhesives can be employed both as one-component adhesives and two-component adhesives. The so-called thermal polyurethane adhesives may also be particularly preferred. As is known, one-component polyurethane adhesives are applied as a single product, whereby the adhesive cures to a water insoluble resin by means of its content of isocyanate groups which react with the wood humidity and/or other polar groups being contained in the wood. Two-component polyurethane adhesives are applied from two different ingredients, and also cure by means of the wood humidity.

For example, a commercial one-component polyurethane adhesive product is the adhesive Prefere 6000 of the company Dynea, Norway, or Collano RP 2501 of the company Collano AG, Switzerland.

Thermal polyurethane adhesives (so-called “hotmelts”), such as offered by the company Henkel, Germany, are applied in a hot form and must be quickly processed. Also here, the curing takes place by means of the wood humidity and/or other polar groups being contained in the wood. In the curing process, said hotmelts change from a thermoplastic to a thermosetting state. For the invention, the heat resistance that results from it is of particular advantage.

Preferably, one-component polyurethanes having a content of cyanate groups are those which are disclosed in the U.S. Pat. No. 3,897,581, the disclosure of which is incorporated into the present invention by reference. It is preferred to apply polyurethanes which were prepared by the reaction of a suitable polyglycol with an appropriate polyisocyanate. Preferably, the reaction is carried out in a way that said polyisocyanate is applied in a stoichiometrical surplus in order to ensure a content of isocyanate groups in the resulting polyurethane that can be adjusted to the property requirements of the block of wood to be glued.

Preferred polyglycols are polyethylene glycol or polypropylene glycol. Particularly, said polyglycol is polypropylene glycol.

Preferably, the polyisocyanate is selected from the group consisting of hexamethylene diisocyanate, xylylene diisocyanate, tolylene diisocyanate, diphenylmethane diisocyanate, dimethyl diisocyanate, hydrogenated diphenylmethane diisocyanate, hydrogenated tolylene diisocyanate, hydrogenated xylylene diisocyanate, and mixtures thereof. The reaction product of diphenylmethane diisocyanate and/or hydrogenated diphenylmethane diisocyanate with a polyglycol is particularly preferred, particularly with polypropylene glycol.

Very good properties are achieved if a polyurethane adhesive is employed, which comprises the reaction product of diphenylmethane diisocyanate with a polyglycol, in particular with propylene glycol.

In a particularly preferred embodiment, said diphenylmethane diisocyanate comprises a mixture of diphenylmethane 4,4'-diisocyanate and diphenylmethane 2,4'-diisocyanate.

It is further preferred that said polyisocyanate of said particularly preferred embodiment optionally also comprises modified diphenymethane diisocyanates, such as hydrogenated diphenymethane diisocyanates, or homologous isocyanates.

Preferably, the isocyanate content in said polyurethane may range between 5 and 25% by weight based on the total amount of said adhesive, more preferred between 10 and 20%, particularly between 13 and 16%.

The above mentioned polyurethane adhesive types from either the company Dynea or Collano are based on diphenylmethane diisocyanate.

Green wood or other wood that may be used in the process according to the invention and that is sawn into board-like, plane pieces of wood may have a humidity of approximately 80%. In gluing board-like, plane pieces of wood having such a high humidity content, the water being bound in the wood can disadvantageously affect the binding properties of the applied adhesive/glue for certain species and for short open time of certain glues. Thereby, said adhesive/glue does not react in the desired manner and the adhesion in the resulting beam-like block of wood does not exhibit the desired stability. Such drawbacks cannot be accepted in the manufacture of a veneer from such a beam-like block of wood. Accordingly, the humidity of said board-like pieces of wood to be glued should be below 50%, preferably clearly below 50%. Board-like pieces of wood having a humidity below 40% are particularly suitable for the process according to the invention for certain species and short open time of certain glues.

Particularly well suited beam-like blocks of wood for the process according to the invention can be produced by a process comprising the following steps:

(j) cooling the surfaces of board-like plane pieces of wood to be glued down to a temperature below 0° C., (jj) heating the surfaces to be glued in order to vaporize the water being present in the area of said surface within the wood, (jjj) subsequently applying the adhesive onto the so treated surfaces, (jv) gluing said board-like plane pieces of wood to a beam-like block of wood.

Preferably, in step (j) said surfaces are cooled down to a temperature between 0° C. and −10° C., preferably between −2° C. and −6° C., in particular between −2° C. and −4° C.

Preferably, said cooling process is carried out in a cooling chamber.

The heating in step (jj) may be affected by radiation, preferably by infrared radiation or UV radiation. However, it is also possible to apply hot air.

In another preferred embodiment of the invention, the new process for the manufacture of a veneer comprises steps (viii) and (ix) prior to step (i):

(viii) cooling the surfaces of board-like plane pieces of wood to be glued to a temperature below 0° C., (ix) heating the surfaces to be glued in order to vaporize the water being present in the area of said surface within the wood.

For the cutting process to veneer, the obtained beam-like block of wood should have a relatively high humidity. According to the invention, preferably, the beam-like block of wood has a relative wood humidity of >30% prior to the cutting. In particular, relative wood humidity of >50% have to be achieved; relative wood humidity between 60% and 80% are particularly advantageous.

It is self-evident that the embodiment of the veneer that is obtained in the processes according to the invention cannot only be varied by the selection of the section planes during the cutting/slicing process.

Moreover, in the scope of the present invention, it is also possible that the modification of the veneer can also be diversely varied by means of the type of the gluing of the individual pieces of wood with each other. So, according to one embodiment of the present invention, it is provided that the board-like, plane pieces of wood are glued to each other such that their fiber direction is essentially parallel to one another. By means of such a gluing, a veneer can be manufactured having a minimum of complexity and having a highest accuracy, which has the optics of a wood flooring in the manner of a "strip flooring" or "plank flooring" and that can be applied onto a suitable substrate. Thereby, it is particularly preferred that the pieces of wood, or at least some of said pieces of wood, have their ends edge-glued to each other.

Furthermore, within the context of the present invention, with respect to the mutual adhesion of the pieces of wood, mixed forms are also possible. So, according to one embodiment of the present invention, it is provided that the board-like, plane pieces of wood are glued on each other to a parquet in the manner of a herringbone pattern. In such herringbone patterns, the fiber directions of some pieces of wood are in parallel to each other, while the fiber directions of other pieces of wood are transverse to each other, what results in pleasing optical effects having a minimum of complexity.

According to one embodiment of the present invention being defined in the claims, pieces of wood of different wood species can be glued to each other in order to create in this manner various veneers or veneer patterns. In said manner, in particular, also striated, thin, linear looking veneer patterns can be created, which cannot be produced by means of the conventional technique, and which can be termed as "industrial inlays".

Moreover, the processes according to the invention can be varied in a preferred manner such that materials being different from wood are inserted or incorporated into the block of wood, which is obtained by the gluing of the pieces of wood. For example, this can occur such that above or below or between pieces of wood at least one material is arranged being different from wood. Fundamentally, here, it can also be thin layers of such materials being different from wood such as foils or the like. Particularly, however, said materials are also (more solid) plane pieces of such materials being different from wood which, like the pieces of wood, can be termed as "board-like". Also said foils, pieces, boards of materials being different from wood, are then incorporated into the composite of pieces of wood by gluing, whereby the arrangement and the sequence of the pieces of wood and the pieces of materials being different from wood can be arbitrarily varied. In this manner, novel veneer materials can be created that consists not only of wood, but also consist of a composite wood having said materials being different from wood. As already mentioned above, as a rule, the gluing is also carried out holohedrally, that is not only the pieces of wood are glued holohedrally among each other by means of an adhesive however, the pieces of material being different from wood are also glued holohedrally among each other and with adjoining pieces of wood. Thereby, frequently, the same adhesives can be used as applied for the wood/wood adhesion, for example, the already mentioned polyurethane adhesives.

Preferably, the mentioned materials being different from wood are metals or metal alloys, whereby here, in particular, aluminum or aluminum alloys have to be emphasized. On the other hand, preferably, as material being different from wood, plastics of any type have to be mentioned, in particular polyolefins such as polypropylene or copolymers with such polyolefins.

In other preferred embodiments of the process according to the invention, it is possible, to employ as adhesive a colored adhesive or a dyed adhesive. By means of said method, in the manufacture of veneers according to the invention, quite consciously, new decorative effects can be achieved which embrace the color of such an adhesive. On the one hand, in this manner, it is possible to adapt the color of the adhesive to the color of the employed pieces of wood respectively to the color of the pieces of material being different from wood. Thereby, the layer of the adhesive does not differ from the layer of said pieces what possibly might be disturbing. On the other hand, the color of the adhesive can thereby be consciously selected in contrast to the color of the employed pieces of wood respectively pieces of material being different from wood. Thereby, in the completed veneer, by means of said contrast, another decorative effect is consciously achieved. For said purpose, optionally, also thicker adhesive layers can be used as it would be required for the technical function of the gluing.

According to the invention, it is self-evident that the idea of the color of the adhesive can be extended to that effect that also the materials being used for the pieces of material being different from wood are either colored or dyed. Accordingly, the respective employed materials are not only restricted to their "natural" color, however, additional further decorative effects can be achieved.

As already mentioned, fundamentally, the thickness/gage of the plane pieces of wood being employed for the gluing is not critical. The same also applies to the thickness/gage of the pieces of materials being different from wood that are incorporated into the wood composite. For processing reasons, however, it is provided that the plane pieces of wood or the plane pieces of materials being different from wood have a thickness/gage of >5 mm. In the so defined range, particularly, thicknesses/gages between 5 mm and 120 mm have to be outlined. This facilitates a processing on machines that already exist in the wood industry. Concerning the length and the width of the pieces of wood or pieces of material being different from wood, reference is made to the following explanations regarding the dimensions of the block of wood, which is produced from pieces of wood/pieces, (and to which is expressively referenced)

Accordingly, also the dimensions of the blocks of wood being obtained in the gluing process of the pieces of wood and the like are not critical, that is they can be varied within wide ranges as long as reasonable. Also here, however, it is provided to select dimensions for the block of wood that enable its processing, that is the cutting/slicing on the usually existing machines for the conventional manufacture of veneers.

Accordingly, such beam-like blocks of wood of the process according to the invention preferably have a length of >1,500 mm, preferably >2,500 mm. Beams with a length up to 5,200 mm can be processed on the common cutting/slicing machines without problems. In particular, respective blocks of wood have a length of approximately 2,800 mm. Preferably, the width of the beam-like blocks of wood is >60 mm, preferably >120 mm, whereby particularly a width of approximately 150 mm has to be outlined. Advantageously, the height of such beam-like blocks of wood is >200 mm, preferably >500 mm. Beams having heights up to 1,000 mm can be processed. In particular, heights of approximately 600 mm have to be emphasized.

Moreover, in the process according to the invention, it is preferred to dry the veneer that is obtained after the cutting/slicing. Preferably, this is carried out at an increased temperature, in particular at a temperature which, dependent on the species of wood, varies between 70° C. and 100° C. In applying increased temperatures, in particular applying temperatures >90° C., usually drying periods up to several minutes are sufficient for a satisfactory drying of the obtained veneer. Thereby, according to the invention, it is particularly preferred that the drying takes place directly after the cutting process.

The inventors have detected that the processing of the respective adhesion surfaces of the board-like, plane pieces of wood has, prior to the gluing, a considerable importance in the scope of the present invention. Due to said background, according to another embodiment of the present invention, it is provided that the adhesion surfaces are planed prior to the gluing, and in particular by application of a rotary machining tool. By means of the planing of the adhesion surfaces, on the one hand, optically pleasing respectively hardly visible glue joints result, and on the other hand, a compact and permanent connection between the respective pieces of wood.

Thereby, it has proved to be particularly advantageous if the rotational axis of the rotary machining tool essentially extends perpendicular to the adhesion surface to be processed. By means of said arrangement, different disadvantages can be avoided being associated with conventional, rotary planers. In particular, any corrugation of the adhesion areas can be avoided, and the cell structure of the wood is less damaged, whereby an open cell structure results which is particularly well suited to accept the adhesive to be applied so that a glue practically invisible joint results. Furthermore, such a tool is also particularly well suited also for humid wood. Last but not least, the arrangement of the rotational axis of the rotary machining tool is essentially perpendicular to the adhesion surface to be processed for an improved fiber removal in which a manifold machining is avoided, whereby a higher durability of the tool and a still more plane surface of the workpiece result.

The so-called "open" time of the adhesive being applied within the scope of the present invention, can be principally regulated by means of its composition or optionally also by means of the processing temperature. In some situations, it can be desirable to have an open time being as long as possible, for example, if a large stack of pieces of wood is formed that subsequently should be pressed. In order to prolong here the open time in a simple and effective manner, according to one embodiment of the present invention, it is provided that the adhesion surfaces of the board-like, plane pieces of wood are pre-dried prior to the gluing, and actually particularly by heating, preferably by irradiation by means of UV light or infrared radiation. By means of the pre-drying of the adhesion surfaces, the open time of the adhesive is prolonged because the wood provides less humidity for the curing of the adhesive. The humidity loss at the surface of the wood is not important for the further procedure, because the humidity content of the wood is balanced within the shortest time.

In one embodiment, preferably, the process according to the invention is characterized in that the obtained veneer has a thickness of >0.25 mm, preferably 0.6 mm. A preferred maximum thickness of the veneer is 4 mm. Thus, with their thickness/gage, such veneers are in the range of usual veneers as they are obtained from the conventional manufacturing processes for veneers.

Besides the described process, the invention comprises the already mentioned board-like block of wood for the manufacture of veneers. Said block is characterized in that board-like, plane pieces of wood are glued by means of an adhesive (preferably holohedrally). Concerning preferred embodiments, it has particularly to be outlined that above or below or between said pieces of wood plane, preferably board-like pieces of a material being different from wood and/or another type of wood can be arranged which, in particular, can be (holohedrally) glued among each other and with said pieces of wood. Particularly, it is possible, as already mentioned in the context of the processes according to the invention, to provide colored or dyed adhesives in order to achieve additional optical effects. Also the pieces of a material being different from wood can optionally be colored or can be dyed.

Regarding the other preferred features of the block of wood according to the invention, reference is made to the respective explanations in the previous description, and it is expressively made reference thereto.

Finally, the invention also comprises the veneer itself which can be obtained from the process according to the invention or which is obtained by cutting along a defined section plane from the beam-like block of wood. Concerning the properties of said veneer according to the invention, also reference is made to the hitherto description, and it is explicitly made reference thereto.

The process according to the invention, the block of wood being obtained according to the invention, and the veneer being obtained according to the invention have a series of particular advantages.

For the solution according to the invention, the initially described procedure according to the prior art is inverted so that the veneer surface to be manufactured is already defined prior to the cutting/slicing, and is only subsequently cut/sliced. An assembling/splicing of the completed product is only partially necessary or not necessary at all. So, one advantage of the process can be predominantly seen therein that there is no need to sort the obtained veneers according to their qualities, and that said veneers then do not have to be trimmed into the usable ranges. By using boards having visible properties and qualities and/or by the additional incorporation of defined pieces of materials being different from wood, the veneer patterns and the veneer qualities, with arbitrary selection of the section plane, can be predetermined. By means of the application of colored or dyed adhesives and by means of the application of colored or dyed pieces of materials being different from wood, a plurality of further decorative effects can be achieved. By the fact that a veneer is cut from a block of wood having defined dimensions, a wood veneer having defined dimensions is created. Thus said wood veneer is a veneer with mostly predefined quality and predefined dimensions; that means it is a real technical veneer, whose aesthetics is similar to a natural spliced veneer surface.

Therefrom, the result is that products can be directly provided from the process itself that are made to measure for the veneer end-user. A further treatment (sorting, cutting, assembling/splicing, and the like) can be completely omitted or is considerably simplified.

The veneers being obtained from the process according to the invention can be further converted by the manufacturer of the veneer himself, for example by the application of appropriately assembled veneer sheets onto a substrate. This is particularly advantageous in the furniture manufacturing because, in this way, quasi a finished product can be provided to the manufacturer of furniture. It is self-evident that different veneer types (different species of wood, patterns from wood and other materials, colored or dyed adhesives) can be produced and can be converted according to customers' requirements.

Just by the combination of wood with materials being different from wood, novel surface patterns and, therewith, a completely new material aesthetic can be created that enlarge the application range of wood veneer.

According to another purpose, the present invention provides a device for the manufacture of a veneer, in particular for carrying out the above described processes, whereby the device has the features being defined in the claims. By means of said device, the processes according to the invention can be realized in a particularly simple and fast manner in order to achieve the advantages which are discussed above. Concerning said advantages, explicit reference is made to the above explanations.

It has to be added that the provision of a plurality of machining elements at the rotational body of the rotary machining tool has the advantage that a particularly plane surface of the planed adhesion surfaces result, whereby the damage of an individual planing element does not directly lead to a worsening of the processing quality. This particularly applies if the machining elements have cutting edges which are essentially in parallel to the rotational plane of the rotational solid.

BRIEF DESCRIPTION OF THE DRAWINGS

For the present invention to be easily understood and readily practiced, the invention will now be described, for purposes of illustration and not limitation, in conjunction with the following figures, wherein:

FIG. 18.1 to 18.3 schematically show a perspective view of a conventional device for the European style manufacture of a veneer.

FIG. 19.1 to 19.2, show perspective views of a device to carry out the novel process for the manufacture of a veneer.

DETAILED DESCRIPTION

The described features and further features of the invention result from the following description of preferred embodiments in conjunction with the dependent claims. Here, the individual features can be realized each alone or in combination with each other.

Figure 13:
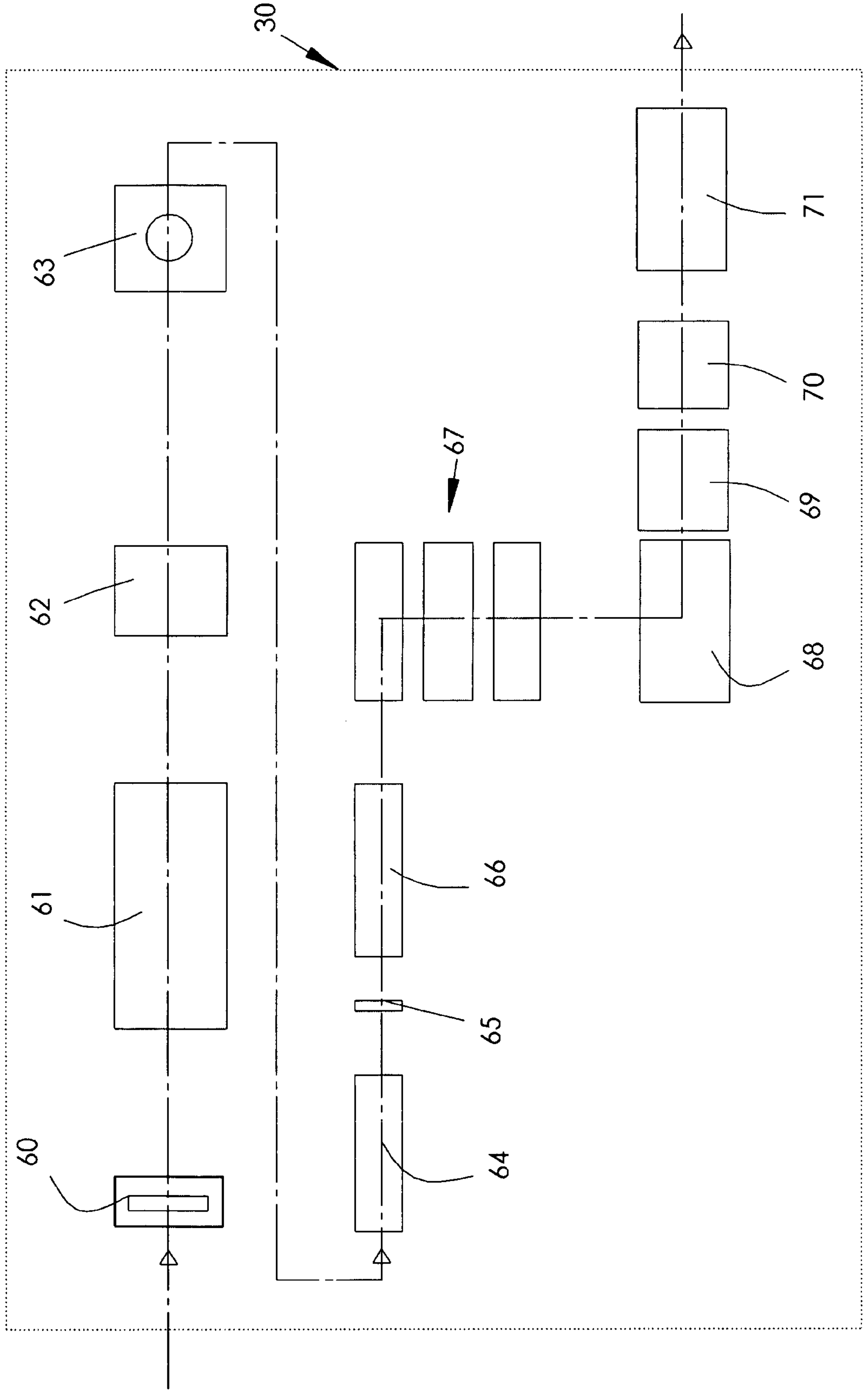
FIG. 13 shows a schematic top view of a device for the manufacture of veneers according to a preferred embodiment of the present invention.

In the following, a preferred embodiment of a device 30 for the manufacture of a veneer according to the present invention is described with reference to FIG. 13. The device 30 being shown in FIG. 13 has a processing sequence that is illustrated by means of a dashed line having an arrow, whereby, along the dashed line, a suitable delivering device can be provided continuously or in sections (not shown here). Thereby, it has to be considered that, in the scope of the present invention, there is no need for the device 30 to provide all the equipment that is shown in FIG. 13.

At first, the device 30 has an equipment 60 for the coarse planing, in which the surfaces of board-like, plane pieces of wood are coarsely planed, for example by means of a planer or the like. Said device is joined by an equipment 61 for the sorting, and an equipment 62 for the processing of edges, whereby in place of said sorting equipment 61, frequently also trained personnel can be employed in order to select such workpieces from the delivered boards are suited for further processing.

Figure 14:
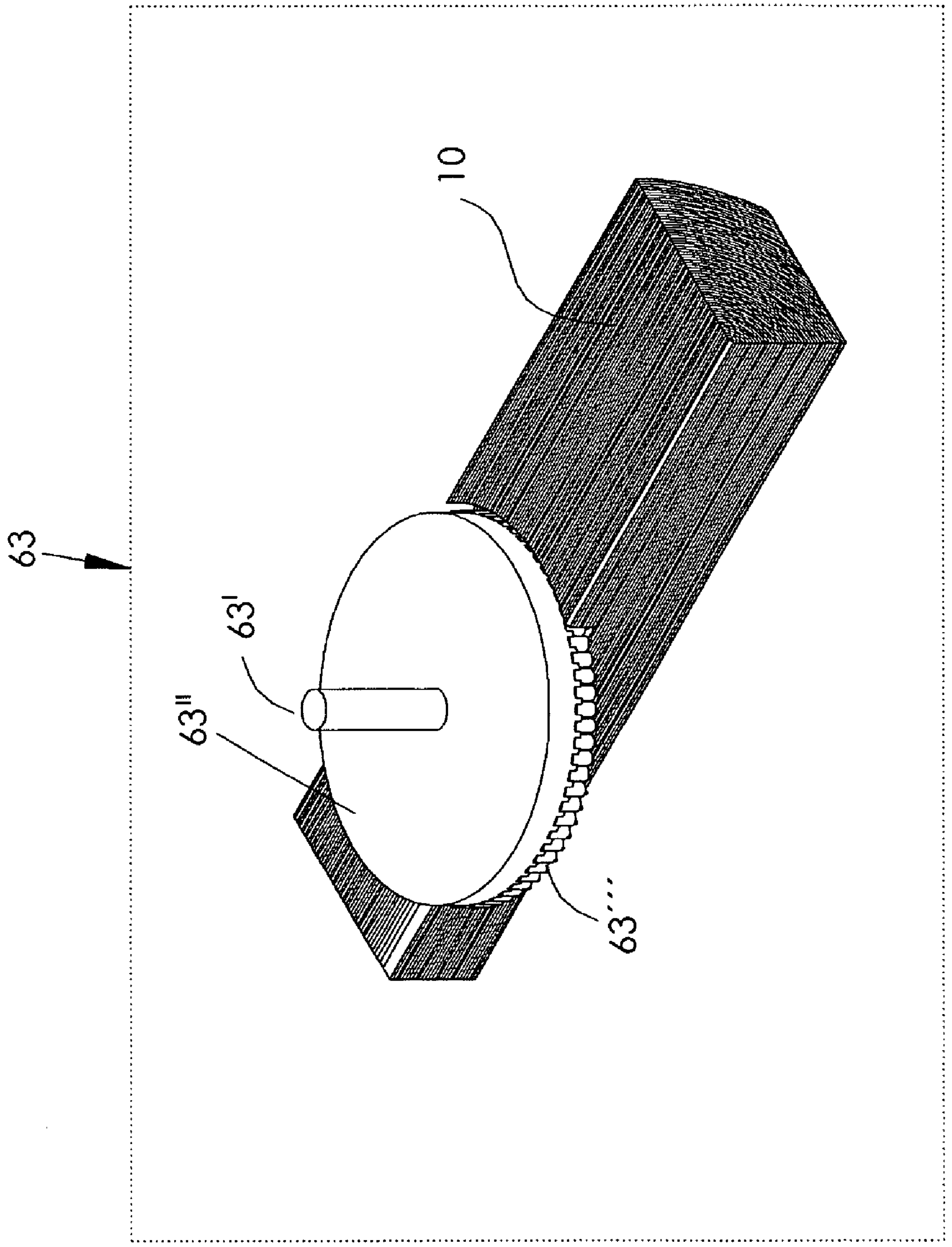
FIG. 14 schematically shows a perspective view of a planing device which preferably is used in the scope of the present invention.
Figure 17:
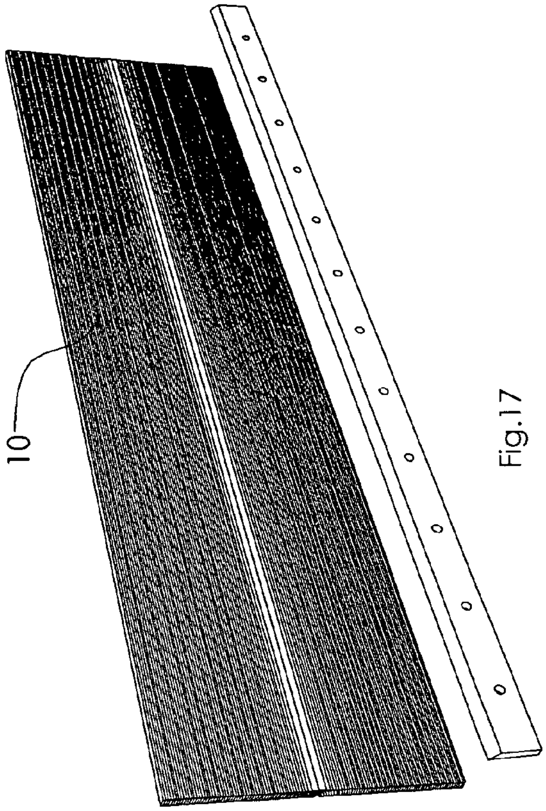
FIG. 17 schematically shows a perspective view of a conventional process for the manufacture of a veneer.
Figure 15:
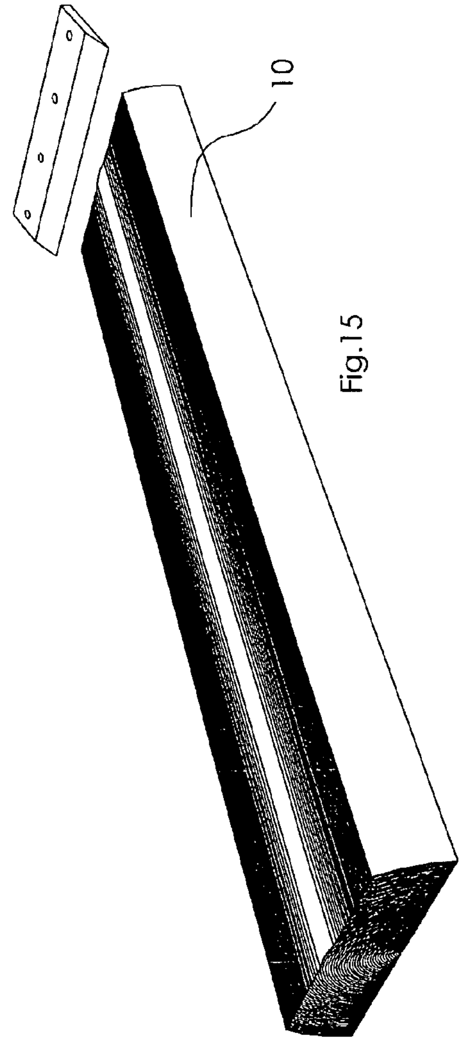
FIG. 15 schematically shows a perspective view of a conventional process for the manufacture of a veneer.
Figure 16:
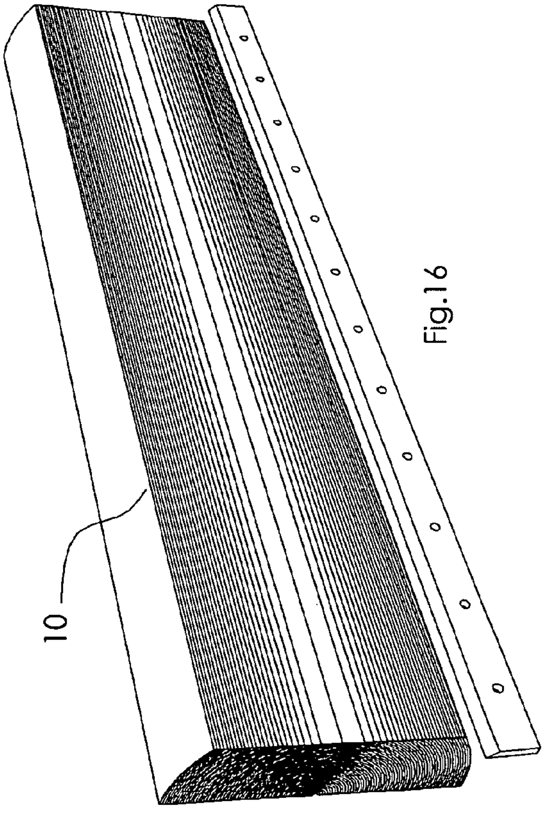
FIG. 16 schematically shows a perspective view of a conventional process for the manufacture of a veneer.

Furthermore, the device 30 has a planing equipment 63 for the "smooth planing" of at least one surface of the respective board-like, plane pieces of wood. In the present embodiment, the planing equipment 63 is a rotary machining tool 63" which, in a perspective view, is schematically presented in FIG. 14. As can be seen in FIG. 14, the rotational axis 63' of the rotary machining tool 63" extends essentially perpendicular to the surface of the piece of wood 10 to be processed. Thereby, the rotary machining tool 63" has a rotational solid having a plurality of cutting edges 63'", whereby said cutting edges each have a knife edge which essentially is parallel to the rotational plane of the rotational solid. In the scope of the present invention, for example, the system "Rotoles" of the company Ledinek-Tec, D-Delmenhorst, can be applied as such a rotary machining tool, though, it is self-evident that the present invention is not restricted thereto.

The planing equipment 63 is joined by a drying equipment 64 for the surface, which, in the present embodiment, is realized by an equipment for UV radiation, hot air or infrared radiation. Said equipment for UV radiation or infrared radiation is arranged such in order to pre-dry the before planed surface of the respective pieces of wood 10 at its surface.

Furthermore, the device 30 has application equipment 65 for the application of an adhesive or glue onto the planed and optionally pre-dried, frozen and reheated surface of the respective pieces of wood. In the scope of the present invention, the application equipment 65 for an adhesive can be designed in very different manners, and, for example, can comprise rollers for glue or the like. However, it has proven to be particularly advantageous if said equipment 65 for the application of an adhesive has a plurality of nozzles for the application of an adhesive (not shown here).

Following, the device 30 comprises a stacking equipment 66 for the pieces of wood which are provided with an adhesive to a beam-like block of wood. Here, for example, it can be a collecting table having downward cycles or the like. The equipment 66 for the stacking is joined by a pressing equipment 67 for the respective beam-like block of wood. The equipment for the pressing, for example, can be run hydraulically, pneumatically or optionally also with weights, and, for example, can be designed as a carousel or as a linear press.

The pressing equipment 67 is joined by a conditioning equipment 68 for the watering and/or tempering of the pressed beam-like block of wood. The equipment 68 for the conditioning, for example, can be a heatable water bath or a steam bath.

Said equipment 68 is followed by a planing equipment 69 (flitch planer) to smooth one side of the beam-like block in order to have it properly mounted on the cutting equipment 70.

Said equipment 69 is joined by a cutting equipment 70 (veneer slicer) for the cutting/slicing of the respectively pressed block of wood to a veneer. Thereby, said equipment 70 for the cutting/slicing can be designed in very different manners, and, for example, can be provided for a horizontal or vertical slicing, for rotary slicing, or for eccentric rotary slicing.

A drying equipment 71 is installed downstream of the cutting/slicing equipment, which, for example, has a flow chamber that hot air passes through.

Finally, in FIG. 18.1 to 18.3, the conventional process is compared with the novel process as schematically illustrated in FIG. 19.1 to 19.2.

In the conventional process according to FIG. 18.1, a log 50 is decorticated/debarked by means of a debarker 58, is then, for example, longitudinally cut in halves by means of a band saw 59, said halves are watered in watering equipment (conditioning equipment 68) and, following, pass a planing equipment 69. The planed halves of said log are subsequently sliced.

In FIG. 19.1 to 19.2 according to the novel process, boards are planed by means of a planing equipment 63 (preferably by means of a planer from company Rotoles). The resulting board-like, plane pieces of wood 10 subsequently pass a drying equipment for the surface 64 (e.g. UV, hot air or infrared radiation) and an application equipment 65 for the application of an adhesive 20. Subsequently, said board-like plane pieces of wood being provided with said adhesive are stacked in the stacking equipment 66 and are pressed in the pressing equipment 67 to one or more beam-like blocks of wood 12. Subsequently, said beam-like block of wood are watered in a conditioning equipment 68 (e.g. a water bath) to adjust the proper humidity content, and are subsequently planed by means of a planer 69 and are sliced in the cutting equipment 70 to a veneer 14. After the drying in the drying equipment 71, the process for the manufacture of a veneer according to the process of the invention may be terminated.

Optionally, the produced veneers may be trimmed in longitudinal direction and/or transverse direction 74, 75 and may be processed by assembling 79.

The new method changes the European-style veneer process such that for all surface patterns that are "plank match", e.g. lumber-look-alikes, the subsequent manufacturing step (the clipping/trimming of the veneer and the labor intensive assembling/splicing process) becomes obsolete. At the same time, it does not require—like the Asian style method—an immediate use and pressing of the veneer surface, as the veneers are dried to a standard humidity content (8-16% humidity content). Having the veneer dried to a low humidity content allows the transport and the storage of the wooden surface before applying it to a substrate.

Furthermore, in the new process according to the invention, wood having different humidity contents can be glued together and/or standard lumber bought on the open market can be used together with freshly sawn lumber/flitches in the same process. It is also possible to mix different species (and materials). Furthermore, the new process also allows the manufacture of veneers to have an invisible glue line using a standard glue, while using standard veneer slicing equipment (including watering/heating and the subsequent drying process). The new process allows the manufacture of a veneered surface that can be stored and transported, while providing a product that can be produced to order at a considerably lower cost than the traditional process.

Further advantages of the new process are that the veneer pattern and the veneer size can be selected and defined before the slicing. The finished wooden surfaces are available after the dryer and there is no need for further processing before the application to the substrate.

By the blending of the process steps according to the invention, the new process overcomes the limitations of prior art.

Also financially, the new process has major advantages. The total manufacturing costs, including the cost for the raw material is at least 20% lower than in the standard process (European-style process). It allows a quality of cut that cannot be achieved without the conditioning process. The capital productivity makes huge improvements. Per stroke of the slicer roughly 3.0 $m^2$ of sellable product is generated rather than 0.6 $m^2$ as in the traditional process. The value of the product per stroke of slicer is three to five times higher. The slicing and drying equipment is by far the most expensive, thereby the most capital intensive equipment in the entire manufacturing chain from the forest to the assembled furniture is used in a significantly more efficient way. The output of one slicer is two-to threefold the output of a traditional process. As standard green lumber can be used the output from the highly efficient hardwood lumber industry can be used as raw material vastly increasing the potentially available resource compared to using veneer logs. In addition the invention allows the use of short cuts and sizes of lumber that are not commonly used in the lumber industry, thereby turning waste into a high value decorative product.

The most important advantage is that a real wooden surface can be produced at a cost per $m^2$ that makes real wood again competitive with other, substitute surface materials like low pressure melamine, high pressure melamine and others. This is a break-through for the industry of surface materials.

In the following, the invention is illustrated by means of some examples.

1. EMBODIMENT

Figure 3:
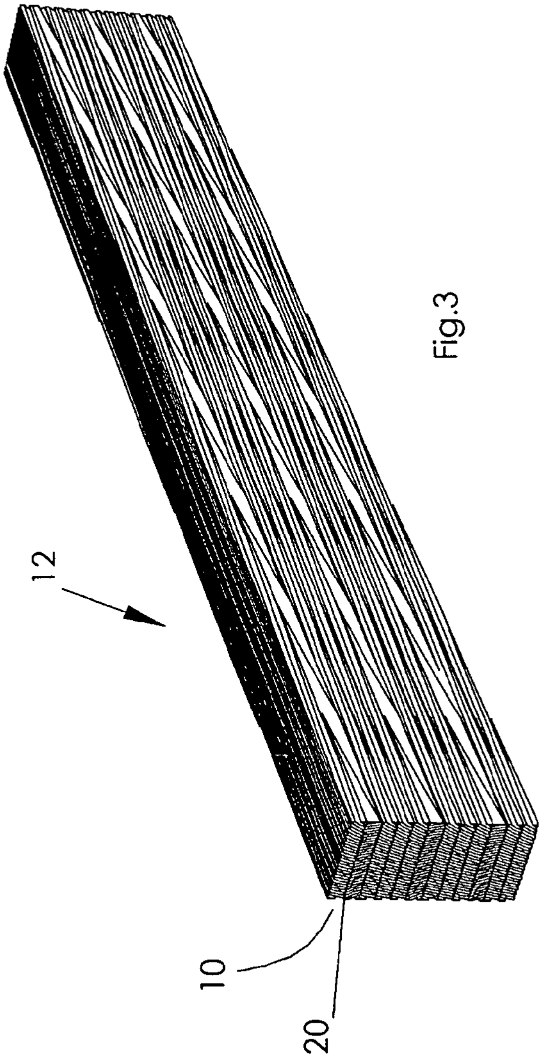
FIG. 3 schematically shows a perspective view of a beam-like block of wood according to a second preferred embodiment of the present invention.
Figure 4:
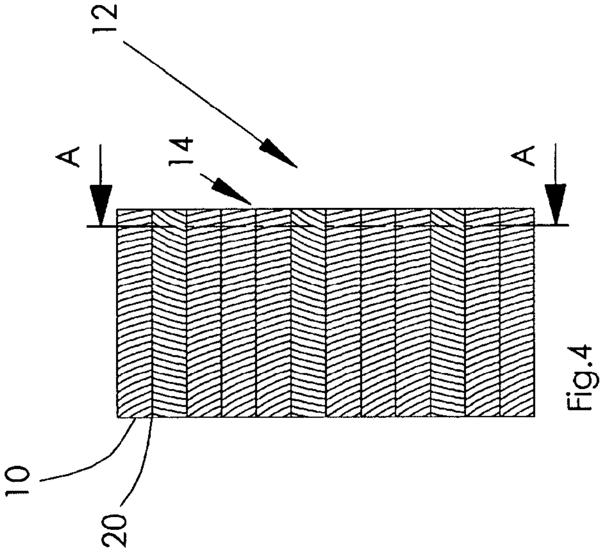
FIG. 4 schematically shows a section view of the beam-like block of wood being shown in FIG. 3.

The operation of the device according to the invention, more specifically, a first preferred embodiment of the process according to the invention, and the products according to the invention are subsequently described with reference to FIGS. 3, 4 and 13.

At first, freshly sawn boards 10 from oak wood or beech wood were provided, the dimensions (length×width×height) of which were 2,400 mm×150 mm×100 mm. The boards were coarsely planed in the equipment 60 for the coarse planing at the later adhesion surfaces, and were subsequently sorted, for example, manually or by means of the sorting equipment 61. Afterward, a processing of the edges was carried out in the respective equipment 62, whereupon the later adhesion surfaces were planed in the planing equipment 63.

Dependent on the desired open time of the adhesive, now, the later adhesion surfaces of the boards 10 can optionally be pre-dried at the surface in the drying equipment 64 for the surface, prior to the application of an adhesive 20 onto the adhesion surfaces in the equipment 65. As an adhesive, thereby, the product Prefere 6000 of the company Dynea was used. Here, it was a one-component polyurethane adhesive for wood construction with an adhesive based on a polyurethane. For the manufacture of the adhesion, said adhesive was holohedrally applied on one side of the respective adhesion surfaces of the boards. For this, in place of nozzles, also a spatula or a roller can be used. The so applied amount of adhesive was about 250 g/$m^2$ per wood surface.

Subsequently, six boards 10 were stacked in the stacking equipment 66 to a beam-like block of wood (with the resulting dimensions length×width×height: 2,400 mm×150 mm×600 mm), respectively, and were glued with each other. Then, in the pressing device 67, the curing of the adhesive was carried out, whereby, in the present situation, a pressure of approximately 1 N/$mm^2$ was applied for a pressing time of approximately 8 hours.

The so obtained beam-like block of wood 12 from the glued solid wood boards 10 had a sufficient rigidity for the subsequent processing steps.

Following, in the conditioning equipment 68, the glued beam-like block of wood was heated in water having a temperature of approximately 80° C. for a period of approximately 2.5 days, and was subsequently sliced to veneer 14 having a thickness of approximately 0.65 mm. In the present situation, the cutting/slicing plane is selected perpendicular to the plane which is defined by the adhesion layers 20, and, actually, in longitudinal direction of the block of wood, so that regular veneers resulted having a width of 600 mm and a length of 2,400 mm. Thereby, the cutting direction is transverse to the wood fibers.

The so obtained veneers 14 were dried directly after the slicing at a temperature of about 140° C. for a period of about 60 seconds.

2. EMBODIMENT

Figure 1:
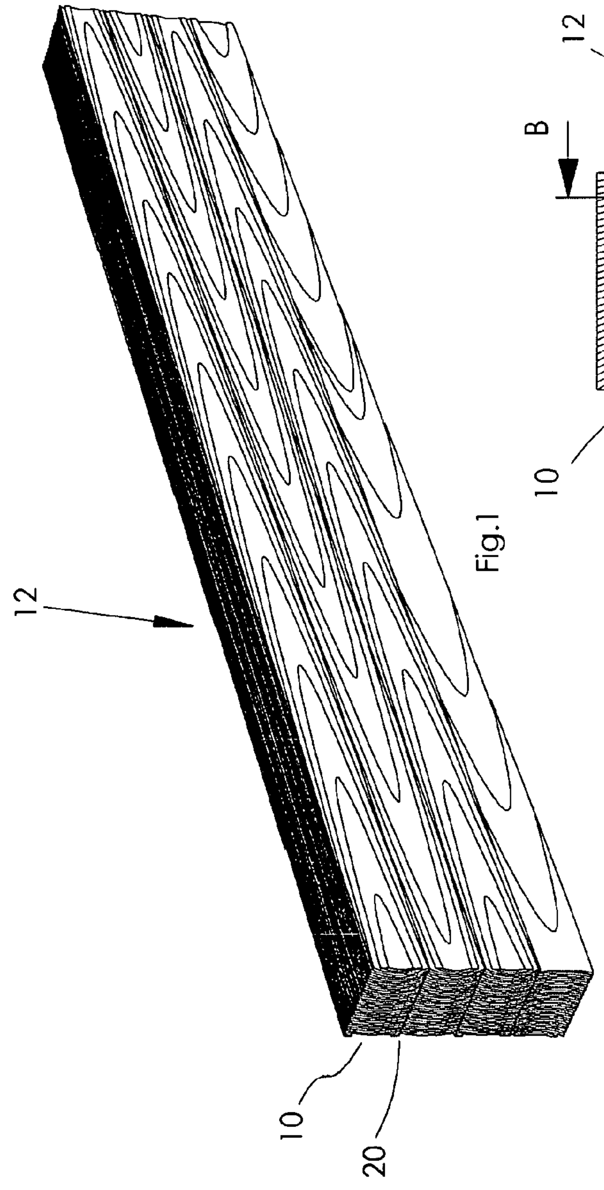
FIG. 1 schematically shows a perspective view of a beam-like block of wood according to a first preferred embodiment of the present invention.
Figure 2:
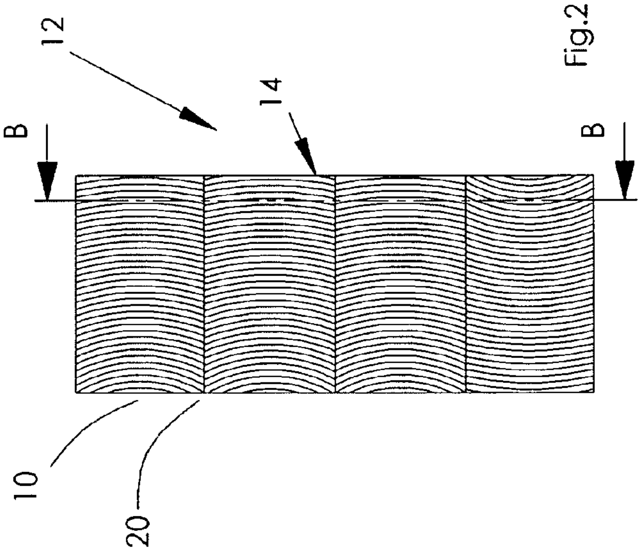
FIG. 2 schematically shows a section view of said beam-like block of wood being shown in FIG. 1.

In the following, a second embodiment of the process according to the invention or the products according to the invention is described with reference to the FIGS. 1, 2 and 13. In principle, the second embodiment corresponds to the above-described process, however, in the second embodiment, waste boards ("backing boards") from oak (solid wood) having a thickness of 13 mm with an amount of a humidity of approximately 65% which result from the manufacture of veneers were provided without an extended storing period for the manufacture of a block of wood according to the invention.

Thereby, the individual boards were laterally and frontally trimmed to a fixed measure of 2,400 mm×150 mm. All in all, 12 individual boards 10 were provided in order to obtain a desired height of 156 mm of the block of wood 12 according to the invention.

After an appropriate planing of the surface of the boards, on one side, an adhesive/glue 20 was applied in the form of stripes with a device for the application of an adhesive of the company Lamello AG (device LK5PUR). The used adhesive formulation was a one-component polyurethane adhesive of the company Collano AG with a processing time (open time) of approximately 7 minutes. Said adhesive comprised the reaction product of diphenylmethane diisocyanate with polypropylene glycol. The applied amount of adhesive was approximately 150 g/$m^2$.

Directly after the gluing, the formed block of wood 12 was pressed for 6 hours in the pressing equipment 67 at a pressure of 0.8 N/$mm^2$. After a subsequent resting period of approximately 12 hours, the so formed block of wood was watered for another 24 hours at a temperature of approximately 80° C. in a water bath 40 (steamed). The block of wood 12 still being hot was then sliced in a cutting/slicing device for veneers to veneers 14 having a thickness of 0.65 mm (in longitudinal direction perpendicular to the adhesion plane), whereupon the so obtained veneers 14 are dried in a drying equipment at a temperature of 140° C. to a relative wood humidity of approximately 8%.

The so obtained material, a technical veneer, had a proper quality and could be clearly distinguished from commercially available veneers regarding the aesthetics having the stripe-like longitudinal structure, of striated, thin, linear looking veneer. Subsequently, they could be applied onto appropriate substrates, for example wooden panels, using different adhesion processes.

Because for technological reasons, in conventional veneer processing, it is not possible to assemble such narrow strips of veneer, said aesthetics in veneer are only realizable by the process according to the invention.

1. Modification

Starting from freshly sawn beech boards, the process according to the $1^{st}$ embodiment was carried out, wherein, all in all, five beech boards were glued to a block of wood according to the invention having a height of 500 mm. The fixed measure of the boards was the same as for the boards 10 according to the $1^{st}$ embodiment.

After the slicing, as a material, a technical veneer was obtained, whose aesthetic was similar to a normal simple assembled/spliced veneer surface. For example, such veneers are used for door panels or for the fronts of furniture.

2. Modification

Backing boards from the conventional veneer production made from walnut and maple were provided having a thickness of 14 mm and, as described in the $2^{nd}$ embodiment, were prepared, planed, optionally cleaned and subsequently glued. In said gluing step, at first 3 boards made from maple, 1 board made from walnut, then 3 boards made from maple, in turn 1 board made from walnut, and finally, in turn 3 boards made from maple were glued on top of each other. By means of said gluing of 11 boards, a block of wood according to the invention resulted having a height of 154 mm. Thus, said wood combination of walnut and maple is particularly preferred, because maple wood and walnut wood have similar drying coefficients, and thus the so obtained layer composite does not tend toward delaminating or tearing.

The technical veneer that was obtained according to said modification, concerning the aesthetics, were similar to a plate being glued in layers from different materials. Because in the conventional manufacture of veneers, for technological reasons, such narrow strips of veneer cannot be glued, said aesthetics in veneer can only be achieved by means of the process according to the invention.

3. Modification

In said modification, it is intended to proceed according to the $2^{nd}$ embodiment, whereby, however, in place of each $6^{th}$ layer of an oak board, it is conceivable to incorporate a layer of a thin aluminum plate (thickness 0.8 mm) into the layer composite and to fix said composite by gluing. In this manner, it is conceivable to obtain a block (of wood) having a height in the range of 131 mm. The result could be a technical veneer, whose aesthetics particularly could have a strongly longitudinal orientation (optical characteristic into the longitudinal orientation) by means of the insert of aluminum. Said modification has not yet been carried out.

3. EMBODIMENT

Figure 5:
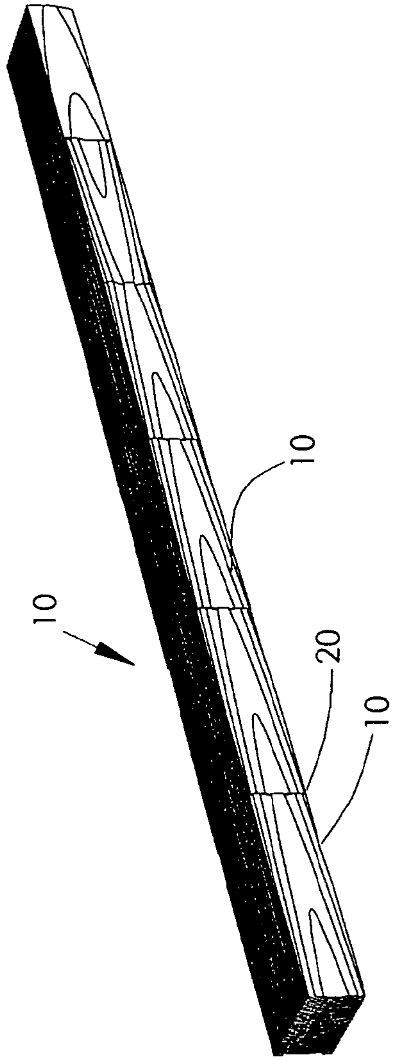
FIG. 5 schematically shows a perspective view of a beam-like block of wood according to a third preferred embodiment of the present invention.
Figure 6:
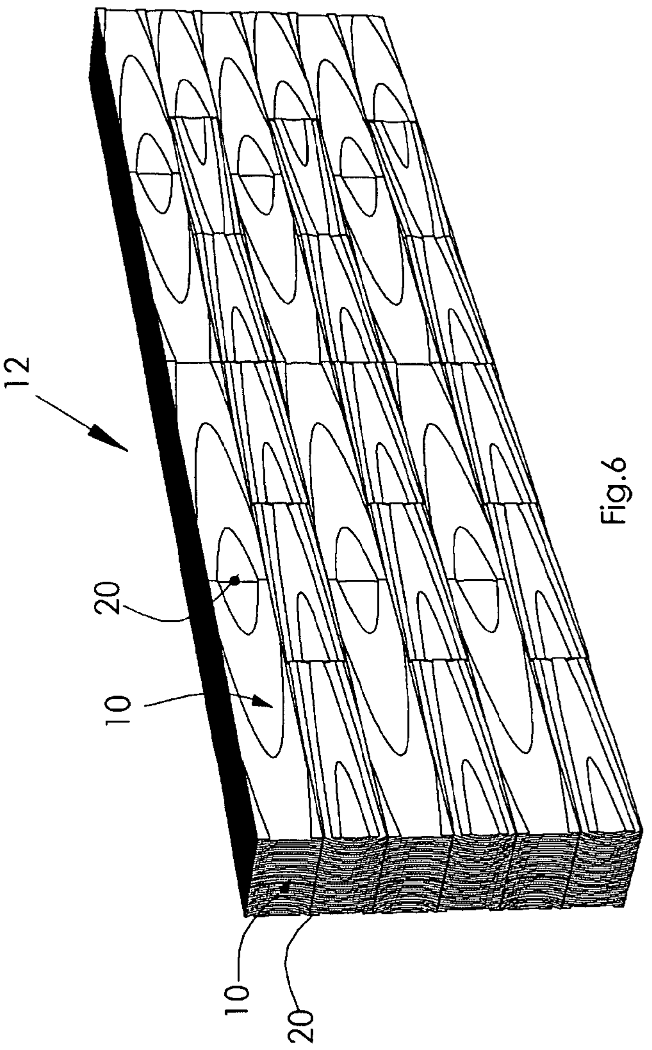
FIG. 6 schematically shows another perspective view of the beam-like block of wood being shown in FIG. 5.
Figure 7:
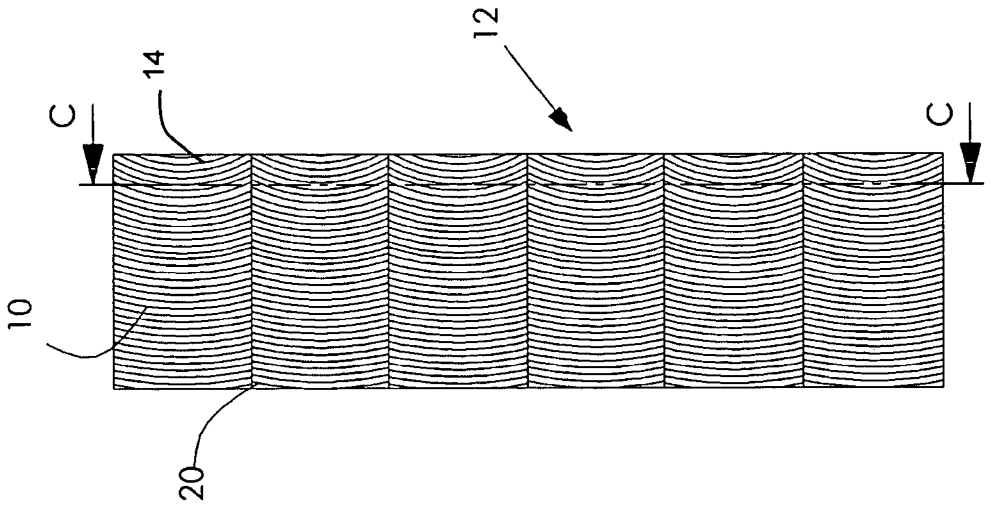
FIG. 7 shows a schematic section view of the beam-like block of wood being shown in FIGS. 5 and 6.

A $3^{rd}$ modification of the invention is described with reference to FIG. 5 to 7. In said embodiment, it was started from boards 10 made from oak wood having the dimensions (length×width×height) of approximately 2,800 mm×150 mm×60 mm. Said oak boards were obtained by the gluing of shorter pieces of wood of oak 10 which were freshly sawn from green lumber, by means of edge gluing the ends with a polyurethane adhesive (product Prefere 6000, company Dynea).

The so obtained boards of oak 10 were planed on both sides to a final thickness of 50 mm, and were further treated according to the process of embodiment 1 or 2. A beam-like block of wood 12 having a height of 300 mm was provided according to the invention, whereby, accordingly, 6 of such oak boards 10 were glued with each other. Then, as already discussed in the embodiment 1 or 2, the cutting/slicing was carried out.

Concerning their surfaces, the so obtained material, a technical veneer 14, were similar to the typical floor arrangement of a parquet made from oak.

4. EMBODIMENT

Figure 8:
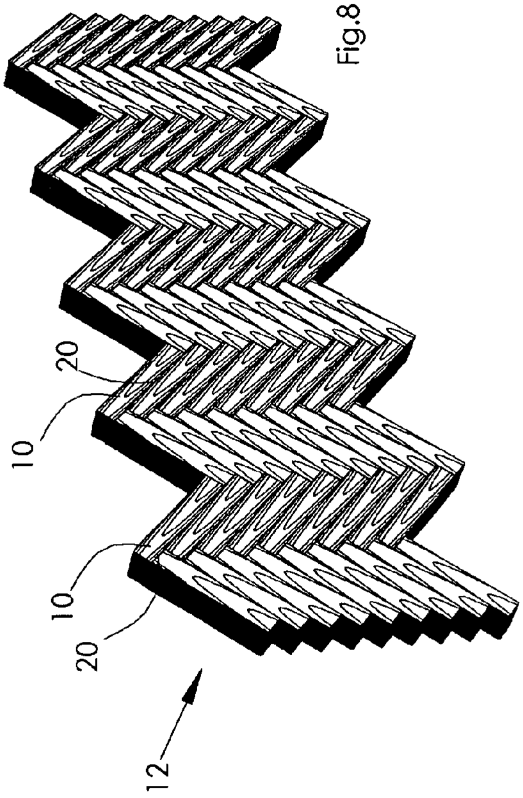
FIG. 8 schematically shows a perspective view of a beam-like block of wood according to a forth preferred embodiment of the present invention.
Figure 10:
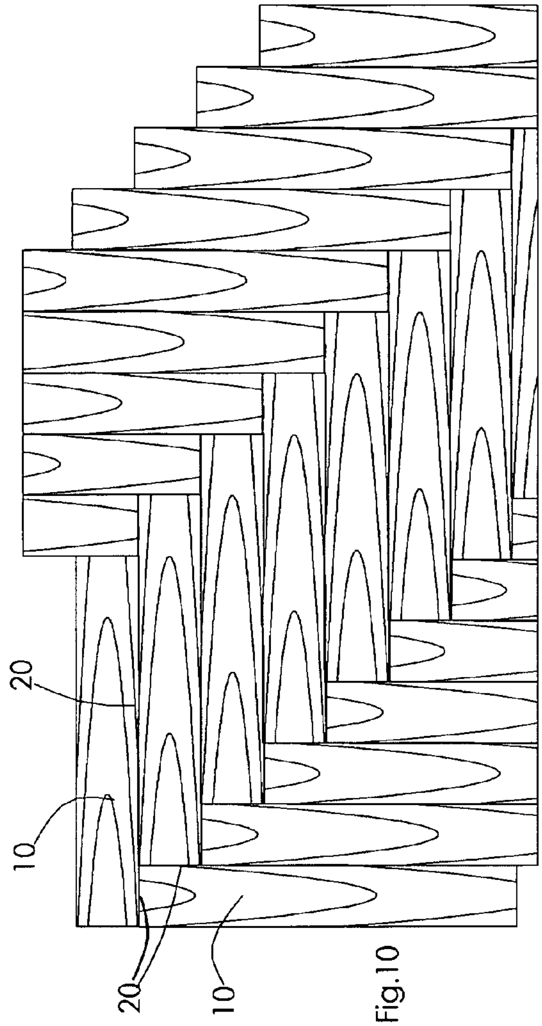
FIG. 10 shows a schematic top view of the beam-like block of wood being shown in FIG. 8.
Figure 9:
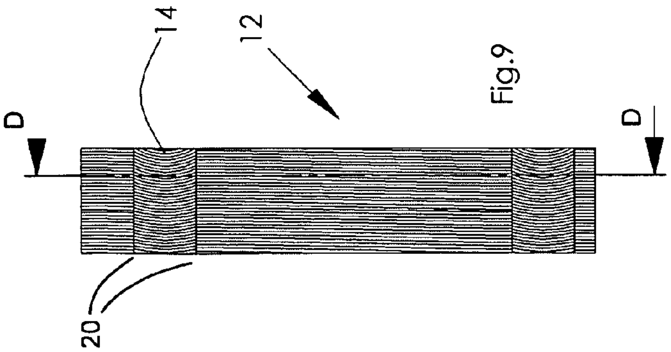
FIG. 9 shows a schematic section view of the beam-like block of wood being shown in FIG. 8.

A fourth embodiment of the invention is described with reference to FIG. 8 to 10. Said embodiment is characterized in that boards of wood 10 were glued to a beam-like block of wood 12 in the manner of a herringbone pattern—as shown in FIGS. 8 and 9. Thereby, adjoining boards of wood 10 were glued to each other at their lateral surfaces, respectively, and the respective front faces of the boards of wood 10 were also glued with lateral faces of adjoining boards of wood 10. Then, as also explained in the embodiment 1 or 2, it was pressed, converted and sliced.

5. EMBODIMENT

Figure 12:
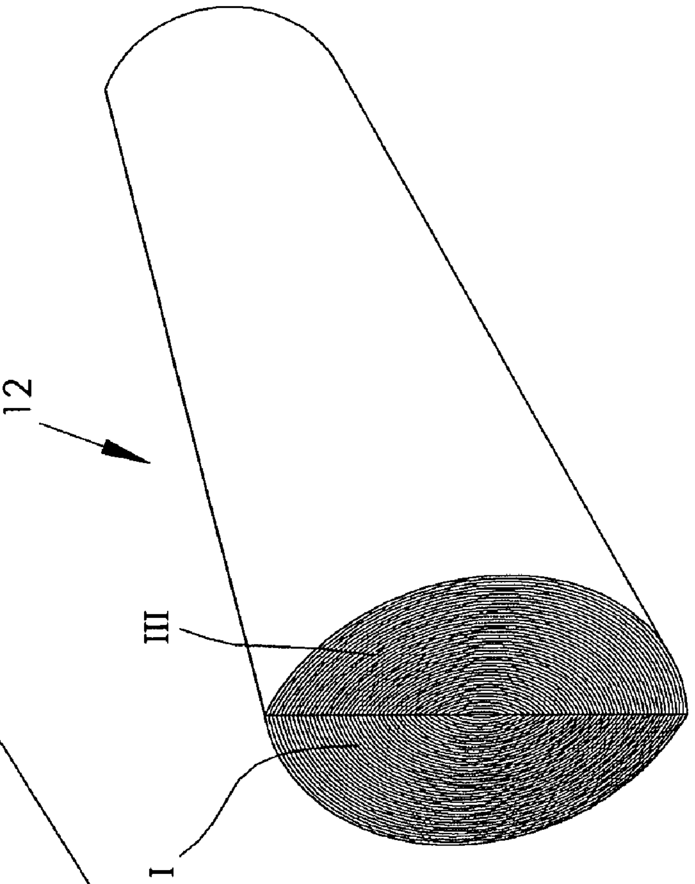
FIG. 12 schematically shows a perspective view of a beam-like block of wood according to a fifth preferred embodiment of the present invention.
Figure 11:
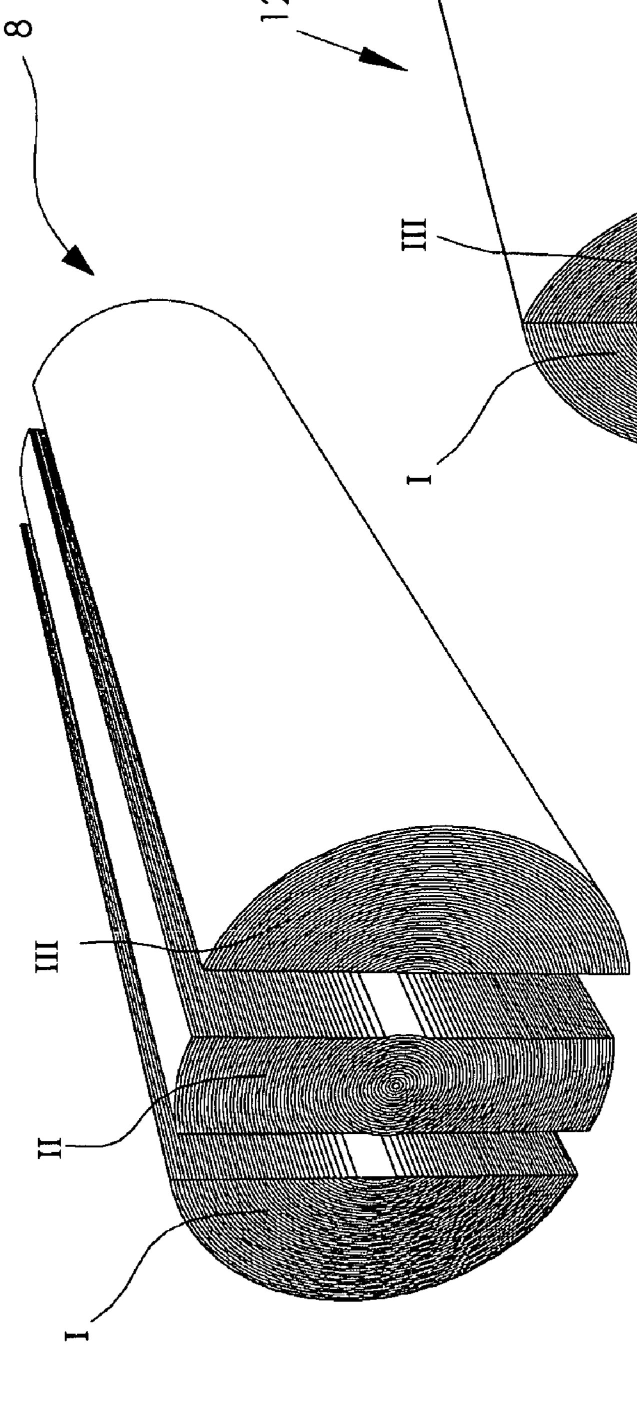
FIG. 11 shows a schematic perspective view of a log which is cleaved into several sections.

A fifth embodiment of the invention is described with reference to FIGS. 11 and 12. In said embodiment, pieces of wood for the manufacture of veneer were obtained, wherein a section II as shown in FIG. 11 was separated from the center of a log 50, whereby, in the present embodiment, said log 50 was cleaved into three sections I, II, III. Several pieces of wood which were formed by the section II could be advantageously processed, as, for example, already described in embodiment 1.

Moreover, also the border sections I, III of the log 50 could advantageously be used for the manufacture of veneers. For this purpose, the border sections I, III, as shown in FIG. 12, were glued to each other at their respective plane side, and were subsequently cut essentially parallel to the plane being defined by the adhesion layer. Here, the course of the process principally corresponded to the process as described above in the first embodiment, except that it is essentially cut parallel to the plane being defined by the adhesion layers.

What is claimed is:

1. A process for the manufacture of a decorative surface veneer, comprising:

gluing board-like, plane pieces of wood together with an adhesive to form a beam-like block of wood, with the adhesive forming layers within the block of wood that each define a plane;

increasing the humidity content of said beam-like block of wood;

slicing a decorative surface veneer from said beam-like block of wood, with the slicing being performed in a plane that is transversely arranged to the plane defined by the adhesive layers; and drying said decorative surface veneer until the humidity content is below a fiber saturation point, wherein said decorative surface veneer maintains a visible grain pattern that includes any defects associated with the original appearance of the type of wood making up the plane pieces of wood.

2. The process of claim 1 wherein said increasing the humidity comprises either watering or tempering said beam-like block of wood.

3. The process of claim 2 wherein said watering comprising watering said beam-like block of wood over a period of days at a temperature of greater than 60° C.

4. The process of claim 1 further comprising one of the following:

prior to said gluing, planing at least one surface of said board-like plane pieces of wood;

prior to said increasing said humidity, pressing said beam-like block of wood;

prior to said pressing, stacking said board-like pieces of wood.

5. The process of claim 4 wherein said planing includes planing with a rotary machining tool.

6. The process of claim 5 wherein the axis of rotation of the rotary machining tool is essentially perpendicular to an adhesion surface.

7. A process for the manufacture of veneer, comprising:

gluing board-like, plane pieces of wood together with an adhesive to form a beam-like block of wood;

increasing the humidity content of said beam-like block of wood;

cutting veneer from said beam-like block of wood; and
drying said veneer until the humidity content is below a fiber saturation point, and
further comprising prior to said gluing, cooling the surfaces of said board-like, plane pieces of wood to be glued to a temperature below 0° C., and heating said surfaces to be glued to vaporize water present in the area of said surfaces.

8. The process of claim 1 wherein a section plane is transversely arranged to a plane which is defined by an adhesion layer.

9. The process of claim 1 wherein said board-like, plane pieces of wood are at least partially solid wood boards.

10. The process of claim 1 wherein said board-like, plane pieces of wood comprise solid wood waste boards.

11. The process of claim 1 wherein said board-like, plane pieces of wood comprise solid wood boards which were separated from a center of a log by cleaving the log into at least three sections.

12. He process of claim 1 wherein said board-like, plane pieces of wood comprise solid wood boards which are essentially semicircular sections separated from border regions of a log, by cleaving the log into at least three sections.

13. The process of claim 12 wherein the essentially semicircular sections are glued to each other with the plane side thereof, and subsequently are cut in a direction parallel to a plane defined by an adhesion layer.

14. The process of claim 1 wherein the humidity content of the board-like, plane pieces of wood is greater than 20%.

15. The process of claim 1 wherein the board-like, plane pieces of wood consist of green timber.

16. The process of claim 1 wherein said gluing is performed using a polyurethane adhesive.

17. The process of claim 16 wherein said adhesive is a one-component polyurethane adhesive.

18. The process of claim 1 wherein said gluing is performed using an adhesive that is one of a colored adhesive or a dyed adhesive.

19. The process of claim 1 wherein said beam-like block of wood has a wood humidity above a fiber saturation point prior to said slicing.

20. The process of claim 1 wherein said gluing includes gluing said board-like, plane pieces of wood to each other such that a fiber direction of each board-like, plane piece of wood is essentially parallel to a fiber direction of each other such board.

21. The process of claim 1 wherein said gluing includes gluing said board-like, plane pieces of wood frontally to each other.

22. The process of claim 1 wherein said gluing includes gluing said board-like, plane pieces of wood to each other in a herringbone pattern.

23. The process of claim 1 wherein said board-like, plane pieces of wood are of different types of wood.

24. The process of claim 1 further comprising gluing materials other than wood to said board-like, plane pieces of wood.

25. The process of claim 24 wherein said other materials include metals, alloys or plastics.

26. The process of claim 1 wherein said board-like, plane pieces of wood have a thickness greater than 5 mm.

27. The process of claim 1 wherein said drying is carried out at an increased temperature of greater than 70° C.

28. The process of claim 1 wherein said slicing includes slicing a veneer having a thickness of greater than 0.25 mm.

29. The process of claim 1 wherein said slicing includes slicing a veneer having a length that is essentially the same as a length of said block of wood.

30. The process of claim 1 wherein said slicing produces a veneer having a surface area of from 1 to 4 $m^2$.

31. A process for the manufacture of a beam-like block of wood, comprising:
cooling surfaces of board-like, plane pieces of wood to be glued to a temperature below 0° C.;
heating said surfaces to be glued to vaporize water present in the area of said surfaces to be glued;
applying an adhesive onto the so treated surfaces;
bringing the adhesive covered surfaces together so as to glue said board-like plane pieces of wood together to form said beam-like block of wood.

32. The process of claim 31 wherein said gluing includes gluing said board-like, plane pieces of wood to each other such that a fiber direction of each board-like, plane piece of wood is essentially parallel to a fiber direction of each other such board.

33. The process of claim 31 wherein said gluing includes gluing said board-like, plane pieces of wood frontally to each other.

34. The process of claim 31 wherein said gluing includes gluing said board-like, plane pieces of wood to each other in a herringbone pattern.

35. The process of claim 31 wherein said board-like, plane pieces of wood are of different types of wood.

36. The process of claim 31 further comprising gluing materials other than wood to said board-like, plane pieces of wood.

37. The process of claim 36 wherein said other materials include metals, alloys or plastics.

38. The process of claim 31 wherein said board-like, plane pieces of wood have a thickness greater than 5 mm.

39. A device for the manufacture of a decorative surface veneer, comprising:
planing equipment for planing at least one surface of board-like, plane pieces of wood;
an applicator for applying adhesive onto the planed surface of the board-like, plane pieces of wood to form adhesive layers between the board-like pieces of wood, with the adhesive layers each defining a plane;
stacking equipment for stacking together the board-like pieces of wood which are provided with an adhesive to form a beam-like block of wood;
pressing equipment for pressing of the beam-like block of wood;
conditioning equipment for increasing the humidity content of said beam-like block of wood;
slicing equipment for slicing said pressed block of wood to form a decorative surface veneer that has an appearance that exhibits the original grain pattern and defect characteristics of the wood, wherein the slicing is performed in a plane that is transverse to the plane defined by the adhesive layers; and
drying equipment for drying of said decorative surface veneer.

40. The device of claim 39 wherein said planing equipment includes at least one rotary machining tool.

41. The device according to claim 40 wherein said rotary machining tool has an axis of rotation arranged to extend perpendicular to the surface to be processed.

42. The device of claim 41 wherein said rotary machining tool has a rotational solid having a plurality of cutting elements, wherein said cutting elements have knife edges which are perpendicular to the axis of rotation of the rotational solid.

43. The device of claim 39 further comprising a heat source.

44. The device of claim 43 wherein said heat source includes one of a UV radiation equipment or an infrared radiation equipment.

45. The device of claim 39 wherein said applicator has a plurality of nozzles for the application of said adhesive.

* * * * *